US008788967B2

(12) United States Patent
Davidson et al.

(10) Patent No.: US 8,788,967 B2
(45) Date of Patent: Jul. 22, 2014

(54) METHODS OF INTERFACING WITH MULTI-INPUT DEVICES AND MULTI-INPUT DISPLAY SYSTEMS EMPLOYING INTERFACING TECHNIQUES

(75) Inventors: Philip L. Davidson, Bronx, NY (US); Jefferson Y. Han, Holliswood, NY (US)

(73) Assignee: Perceptive Pixel, Inc., New York, NY (US)

( * ) Notice: Subject to any disclaimer, the term of this patent is extended or adjusted under 35 U.S.C. 154(b) by 1078 days.

(21) Appl. No.: 12/420,475

(22) Filed: Apr. 8, 2009

(65) Prior Publication Data
US 2009/0259964 A1    Oct. 15, 2009

Related U.S. Application Data

(60) Provisional application No. 61/043,863, filed on Apr. 10, 2008.

(51) Int. Cl.
*G06F 3/048* (2013.01)
*G06F 3/033* (2013.01)

(52) U.S. Cl.
USPC ............ 715/788; 715/799; 715/800; 715/863

(58) Field of Classification Search
CPC ............ G06F 2203/04808; G06F 2203/04104
USPC ......................... 715/754, 788, 799, 800, 863; 345/619–688
See application file for complete search history.

(56) References Cited

U.S. PATENT DOCUMENTS

| | | | |
|---|---|---|---|
| 5,113,251 A | | 5/1992 | Ichiyanagi et al. |
| 5,227,771 A | * | 7/1993 | Kerr et al. ..................... 715/800 |
| 5,386,483 A | | 1/1995 | Shibazaki |
| 5,473,740 A | * | 12/1995 | Kasson .......................... 345/628 |
| 5,483,261 A | | 1/1996 | Yasutake |
| 5,565,891 A | * | 10/1996 | Armstrong .................... 345/167 |
| 5,815,151 A | * | 9/1998 | Argiolas ........................ 715/800 |
| 5,825,352 A | * | 10/1998 | Bisset et al. ................... 345/173 |
| 5,844,547 A | | 12/1998 | Minakuchi et al. |
| 5,847,705 A | | 12/1998 | Pope |
| 5,864,342 A | | 1/1999 | Kajiya et al. |
| 6,021,221 A | | 2/2000 | Takaha |

(Continued)

FOREIGN PATENT DOCUMENTS

| | | |
|---|---|---|
| JP | 2000-163031 A | 6/2000 |
| JP | 2005-214730 | 8/2005 |
| JP | 2007-140060 A | 7/2007 |
| WO | 2009/126710 A2 | 10/2009 |

OTHER PUBLICATIONS

Buxton, W., Hill, R., and Rowley, P., "Issues and Techniques in Touch-Sensitive Tablet Input," Proceedings of the 12th Annual Conference on Computer Graphics and Interactive Techniques SIGGRAPH '85, ACM Press, New York, N.Y., 215-224 (1985).

(Continued)

*Primary Examiner* — Amy Ng
*Assistant Examiner* — William Wong
(74) *Attorney, Agent, or Firm* — Aaron Chatterjee; Andrew Sanders; Micky Minhas

(57) ABSTRACT

Methods and systems for interfacing with multi-input devices employ various techniques for controlling the window framing of images. Such techniques provide control, including moving, sizing, and orientating, of one or more displayed window frames in which one or more images are displayed.

42 Claims, 18 Drawing Sheets

(56) References Cited

U.S. PATENT DOCUMENTS

| | | | |
|---|---|---|---|
| 6,037,939 A * | 3/2000 | Kashiwagi et al. | 715/798 |
| 6,061,177 A | 5/2000 | Fujimoto | |
| 6,084,598 A * | 7/2000 | Chekerylla | 345/441 |
| 6,147,684 A | 11/2000 | Nielsen et al. | |
| 6,252,608 B1 | 6/2001 | Snyder et al. | |
| 6,275,615 B1 | 8/2001 | Ida et al. | |
| 6,292,194 B1 | 9/2001 | Powell, III | |
| 6,323,846 B1 * | 11/2001 | Westerman et al. | 345/173 |
| 6,326,964 B1 | 12/2001 | Snyder et al. | |
| 6,377,276 B1 * | 4/2002 | Ludtke | 345/620 |
| 6,958,749 B1 | 10/2005 | Matsushita et al. | |
| 7,015,894 B2 * | 3/2006 | Morohoshi | 345/156 |
| 7,197,718 B1 | 3/2007 | Westerman et al. | |
| 7,296,243 B2 * | 11/2007 | Lira | 715/799 |
| 7,487,458 B2 | 2/2009 | Jalon et al. | |
| 7,519,223 B2 | 4/2009 | Dehlin et al. | |
| 7,610,563 B2 | 10/2009 | Nelson et al. | |
| 7,653,883 B2 | 1/2010 | Hotelling et al. | |
| 7,663,607 B2 | 2/2010 | Hotelling et al. | |
| 7,683,893 B2 * | 3/2010 | Kim | 345/173 |
| 7,728,821 B2 | 6/2010 | Hillis et al. | |
| 7,785,180 B1 | 8/2010 | von Ahn et al. | |
| 7,812,826 B2 | 10/2010 | Ording et al. | |
| 7,877,707 B2 | 1/2011 | Westerman et al. | |
| 7,925,996 B2 | 4/2011 | Hofmeister et al. | |
| 7,956,847 B2 | 6/2011 | Christie | |
| 8,004,498 B1 | 8/2011 | Meridian | |
| 8,027,439 B2 | 9/2011 | Zoldi et al. | |
| 2002/0036617 A1 * | 3/2002 | Pryor | 345/156 |
| 2002/0036618 A1 * | 3/2002 | Wakai et al. | 345/157 |
| 2002/0070944 A1 | 6/2002 | Deering | |
| 2002/0128547 A1 | 9/2002 | Furuhashi et al. | |
| 2002/0185981 A1 | 12/2002 | Dietz et al. | |
| 2003/0206179 A1 | 11/2003 | Deering | |
| 2004/0239982 A1 * | 12/2004 | Gignac | 358/1.15 |
| 2005/0052427 A1 | 3/2005 | Wu et al. | |
| 2005/0057524 A1 * | 3/2005 | Hill et al. | 345/173 |
| 2005/0071774 A1 * | 3/2005 | Lipsky et al. | 715/788 |
| 2005/0097161 A1 | 5/2005 | Chiou et al. | |
| 2005/0144189 A1 | 6/2005 | Edwards et al. | |
| 2005/0175251 A1 | 8/2005 | Taketa et al. | |
| 2005/0270311 A1 | 12/2005 | Rasmussen et al. | |
| 2006/0001650 A1 | 1/2006 | Robbins et al. | |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0028394 A1 | 2/2006 | Love et al. | |
| 2006/0032680 A1 | 2/2006 | Elias et al. | |
| 2006/0080621 A1 * | 4/2006 | Park | 715/788 |
| 2006/0171702 A1 | 8/2006 | Guillou et al. | |
| 2006/0181518 A1 * | 8/2006 | Shen et al. | 345/173 |
| 2006/0181519 A1 | 8/2006 | Vernier et al. | |
| 2006/0232567 A1 | 10/2006 | Westerman et al. | |
| 2006/0238518 A1 | 10/2006 | Westerman et al. | |
| 2006/0238519 A1 | 10/2006 | Westerman et al. | |
| 2006/0238520 A1 | 10/2006 | Westerman et al. | |
| 2006/0238521 A1 | 10/2006 | Westerman et al. | |
| 2006/0238522 A1 | 10/2006 | Westerman et al. | |
| 2006/0274046 A1 | 12/2006 | Hillis et al. | |
| 2006/0284874 A1 * | 12/2006 | Wilson | 345/473 |
| 2006/0289772 A1 | 12/2006 | Johnson et al. | |
| 2007/0070050 A1 | 3/2007 | Westerman et al. | |
| 2007/0070051 A1 | 3/2007 | Westerman et al. | |
| 2007/0070052 A1 | 3/2007 | Westerman et al. | |
| 2007/0078919 A1 | 4/2007 | Westerman et al. | |
| 2007/0081726 A1 | 4/2007 | Westerman et al. | |
| 2007/0096945 A1 | 5/2007 | Rasmussen et al. | |
| 2007/0097151 A1 * | 5/2007 | Rosenberg | 345/660 |
| 2007/0109323 A1 * | 5/2007 | Nakashima | 345/661 |
| 2007/0120833 A1 * | 5/2007 | Yamaguchi et al. | 345/173 |
| 2007/0139395 A1 | 6/2007 | Westerman et al. | |
| 2007/0152984 A1 * | 7/2007 | Ording et al. | 345/173 |
| 2007/0262964 A1 * | 11/2007 | Zotov et al. | 345/173 |
| 2007/0268273 A1 | 11/2007 | Westerman et al. | |
| 2007/0279692 A1 | 12/2007 | Chae et al. | |
| 2008/0015440 A1 | 1/2008 | Shandas et al. | |
| 2008/0036743 A1 * | 2/2008 | Westerman et al. | 345/173 |
| 2008/0165140 A1 * | 7/2008 | Christie et al. | 345/173 |
| 2008/0178126 A1 * | 7/2008 | Beeck et al. | 715/863 |
| 2008/0179507 A2 | 7/2008 | Han | |
| 2008/0211766 A1 * | 9/2008 | Westerman et al. | 345/156 |
| 2008/0246722 A1 * | 10/2008 | Tsuzaki et al. | 345/104 |
| 2008/0270886 A1 * | 10/2008 | Gossweiler et al. | 715/227 |
| 2008/0301577 A1 | 12/2008 | Onda et al. | |
| 2009/0016622 A1 | 1/2009 | Itakura | |
| 2009/0027418 A1 | 1/2009 | Maru et al. | |
| 2009/0031243 A1 | 1/2009 | Kano et al. | |
| 2009/0074304 A1 | 3/2009 | Momosaki | |
| 2009/0112452 A1 | 4/2009 | Buck et al. | |
| 2009/0147138 A1 | 6/2009 | Pawlowski | |
| 2009/0199128 A1 | 8/2009 | Matthews et al. | |
| 2009/0216808 A1 | 8/2009 | Wallace | |
| 2009/0222724 A1 | 9/2009 | Steward et al. | |
| 2009/0251486 A1 | 10/2009 | Sakakibara et al. | |
| 2011/0173566 A1 | 7/2011 | Ubillos | |

OTHER PUBLICATIONS

Chen, Michael, "A Study in Interactive 3-D Rotation Using 2-D Control Devices," Computer Graphics, vol. 22, No. 4, 121-129 (1988).

Shoemake K., "ARCBALL: A User Interface for Specifying Three-Dimensional Orientation Using a Mouse," Proceedings of the conference on Graphics interface '92, 151-156 (1992).

Ken Hinckley, "Haptic Issues for Virtual Manipulation," A Dissertation Presented to the Faculty of the School of Engineering and Applied Science at the University of Virginia, section 6.1-6.3 (1996), from the website http://research.microsoft.com/Users/kenh/thesis/front.html.

Dietz, P. and Leigh, D., "DiamondTouch: A Multi-User Touch Technology," Proceedings of the 14th Annual ACM Symposium on User Interface Software and Technology (Orlando, Fla., Nov. 11-14, 2001), UIST '01. ACM Press, New York, N.Y., 219-226 (2001).

Lee, S., Buxton, W. and Smith, K. C., "A Multi-Touch Three Dimensional Touch-Sensitive Tablet," Proceedings of the SIGCHI Conference on Human Factors in Computing Systems (San Francisco, Calif., United States), CHI '85. ACM Press, New York, N.Y., 21-25 (1985).

Malik, S. and Laszlo, J., "Visual Touchpad: A Two-Handed Gestural Input Device," Proceedings of the 6th International Conference on Multimodal Interfaces (State College, Pa., USA, Oct. 13-15, 2004), ICMI '04. ACM Press, New York, N.Y., 289-296 (2004).

Rekimoto, J., "SmartSkin: An Infrastructure for Freehand Manipulation on Interactive Surfaces," Proceedings of the SIGCHI Conference on Human Factors in Computing Systems, CHI '02, ACM Press, New York, N.Y., 113-120 (2002).

Westerman, W., Elias, J. G., and Hedge, A., "Multi-Touch: A New Tactile 2-D Gesture Interface for Human-Computer Interaction," Proceedings of the Human Factors and Ergonomics Society 45th Annual Meeting (Minneapolis/St. Paul, Minn., Oct. 2001), 632-636 (2001).

Wilson, A. D., "TouchLight: An Imaging Touch Screen and Display for Gesture-Based Interaction," Proceedings of the 6th International Conference on Multimodal Interfaces (State College, Pa., USA, Oct. 13-15, 2004), ICMI '04. ACM Press, New York, N.Y., 69-76 (2004).

Wu, M. and Balakrishnan, R., "Multi-Finger and Whole Hand Gestural Interaction Techniques for Multi-User Tabletop Displays," Proceedings of the 16th Annual ACM Symposium on User Interface Software and Technology (Vancouver, Canada, Nov. 2-5, 2003), UIST '03, ACM Press, New York, N.Y., 193-202 (2003), each of which is incorporated herein by reference.

R. Balakrishnan and K. Hinckley, "Symmetric bimanual interaction," CHI '00: Proceedings of the SIGCHI conference on Human factors in computing systems, 33-40 (2000).

R. Balakrishnan and G. Kurtenbach, "Exploring bimanual camera control and object manipulation in 3D graphics interfaces," CHI '99: Proceedings of the SIGCHI conference on Human factors in computing systems, 56-63 (1999).

(56) References Cited

OTHER PUBLICATIONS

Y. Guiard, "Asymmetric division of labor in human skilled bimanual action: The kinetic chain as a model," Journal of Motor Behavior, 19(4):486-517 (1987).
K. Hinckley, R. Pausch, J. C. Goble, and N. F. Kassel, "Passive real-world interface props for neurosurgical visualization," CHI '94: Proceedings of the SIGCHI conference on Human factors in computing systems, 452-458 (1994).
G. Kurtenbach, G. Fitzmaurice, T. Baudel, and B. Buxton, "The design of a GUI paradigm based on Tablets, Two-hands, and Transparency," CHI '97: Proceedings of the SIGCHI conference on Human factors in computing systems, 35-42 (1997).
I. Llamas, B. Kim, J. Gargus, J. Rossignac, and C. D. Shaw, "Twister: a space-warp operator for the two-handed editing of 3D shapes," ACM Transactions on Graphics, 22(3):66 3-668 (2003).
R. Zeleznik, A. Forsberg, and P. Strauss, "Two pointer input for 3D interaction," SI3D '97: Proceedings of the 1997 symposium on Interactive 3D graphics, 115-120 (1997).
Agarawala, A. and Balakrishnan, R. 2006, "Keepin' it real: pushing the desktop metaphor with physics, piles and the pen," Proceedings of the SIGCHI Conference on Human Factors in Computing Systems, (Montréal, Québec, Canada, Apr. 22-27, 2006) CHI '06. ACM, New York, NY, 1283-1292.
Beaudouin-Lafon, M. 2001, "Novel interaction techniques for overlapping windows," Proceedings of the 14th Annual ACM Symposium on User interface Software and Technology (Orlando, Florida, Nov. 11-14, 2001). UIST '01. ACM, New York, NY, 153-154.
Bier, E. A., Stone, M. C., Pier, K., Buxton, W., and DeRose, T. D. 1993, "Toolglass and magic lenses: the see-through interface," Proceedings of the 20th Annual Conference on Computer Graphics and Interactive Techniques SIGGRAPH '93. ACM, New York, NY, 73-80.
Buxton, W., Hill, R., and Rowley, P. 1985, "Issues and techniques in touch-sensitive tablet input," SIGGRAPH Comput. Graph. 19, 3 (Jul. 1985), 215-224.
Dragicevic, P. 2004, "Combining crossing-based and paper-based interaction paradigms for dragging and dropping between overlapping windows," Proceedings of the 17th Annual ACM Symposium on User interface Software and Technology (Santa Fe, NM, USA, Oct. 24-27, 2004). UIST '04. ACM, New York, NY, 193-196.
Gingold, Y. I., Davidson, P. L., Han, J. Y., and Zorin, D. 2006, "A direct texture placement and editing interface," Proceedings of the 19th Annual ACM Symposium on User interface Software and Technology (Montreux, Switzerland, Oct. 15-18, 2006). UIST '06. ACM, New York, NY, 23-32.
Han, J. Y. 2005, "Low-cost multi-touch sensing through frustrated total internal reflection," Proceedings of the 18th Annual ACM Symposium on User interface Software and Technology (Seattle, WA, USA, Oct. 23-26, 2005). UIST '05. ACM, New York, NY, 115-118.
Mander, R., Salomon, G., and Wong, Y. Y. 1992, "A 'pile' metaphor for supporting casual organization of information," Proceedings of the SIGCHI Conference on Human Factors in Computing Systems (Monterey, California, United States, May 3-7, 1992). P. Bauersfeld, J. Bennett, and G. Lynch, Eds. CHI '92. ACM, New York, NY, 627-634.
Ramos, G., Boulos, M., and Balakrishnan, R. 2004, "Pressure widgets," Proceedings of the SIGCHI Conference on Human Factors in Computing Systems (Vienna, Austria, Apr. 24-29, 2004). CHI '04. ACM, New York, NY, 487-494.
Ramos, G., Robertson, G., Czerwinski, M., Tan, D., Baudisch, P., Hinckley, K., and Agrawala, M. 2006, "Tumble! Splat! helping users access and manipulate occluded content in 2D drawings," Proceedings of the Working Conference on Advanced Visual interfaces (Venezia, Italy, May 23-26, 2006), AVI '06. ACM, New York, NY, 428-435.
Terrenghi, L., Kirk, D., Sellen, A., and Izadi, S. 2007, "Affordances for manipulation of physical versus digital media on interactive surfaces," Proceedings of the SIGCHI Conference on Human Factors in Computing Systems (San Jose, California, USA, Apr. 28-May 3, 2007). CHI '07. ACM, New York, NY, 1157-1166.
Wiley, K. and Williams, L. R. 2006, "Representation of interwoven surfaces in 2 1/2 D drawing," Proceedings of the SIGCHI Conference on Human Factors in Computing Systems CHI '06. ACM, New York, NY, 65-74.
Non-final Office Action issued in U.S. Appl. No. 12/420,480, mailed Sep. 28, 2011, 9 pages.
Non-final Office Action issued in U.S. Appl. No. 12/420,493, mailed Oct. 7, 2011, 11 pages.
Non-final Office Action issued in U.S. Appl. No. 12/420,501, mailed Oct. 7, 2011, 24 pages.
Adobe® Illustrator® CS3, User Guide, Copyright 2007 Adobe Systems Incorporated, 495 pages.
Using FreeHand MX, Macromedia FreeHand MX, Copyright 1988-2003 Macromedia, Inc., 412 pages.
A Guide to QuarkXPress™: Using QuarkXPress™, Copyright 2002 by Quark Technology Partnership, 674 pages.
MacDraw Pro, Computer Desktop Encyclopedia copyright 1981-2011 by The Computer Language Company Inc., downloaded from http://encyclopedia2.thefreedictionary.com/p/MacDraw%20Pro, 1 page.
ClarisDraw: Description, Article: TA43075, Last modified Oct. 4, 2008, 3 pages.
International Search Report issued Oct. 22, 2009 in International Application No. PCT/US2009/039907, 2 pages.
International Preliminary Report on Patentability and Written Opinion of the International Searching Authority mailed Oct. 22, 2009 in International Application No. PCT/US2009/039907, 8 pages.
Final Office Action issued in U.S. Appl. No. 12/420,480, mailed Mar. 22, 2012, 24 pages.
Final Office Action issued in U.S. Appl. No. 12/420,501, mailed Jul. 20, 2012, 37 pages.

* cited by examiner

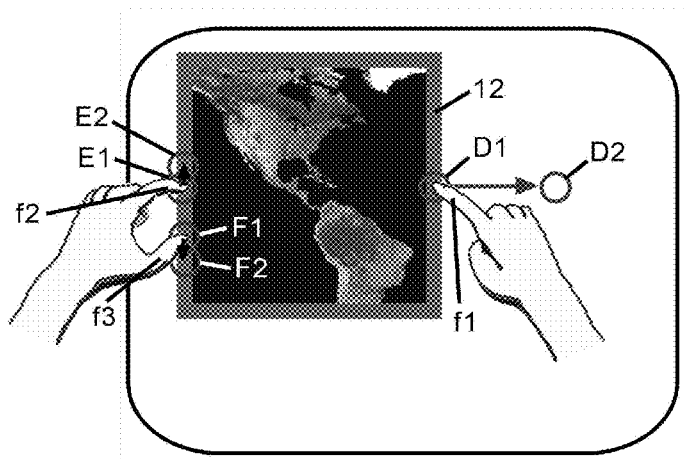
FIG. 3A
FIG. 3B
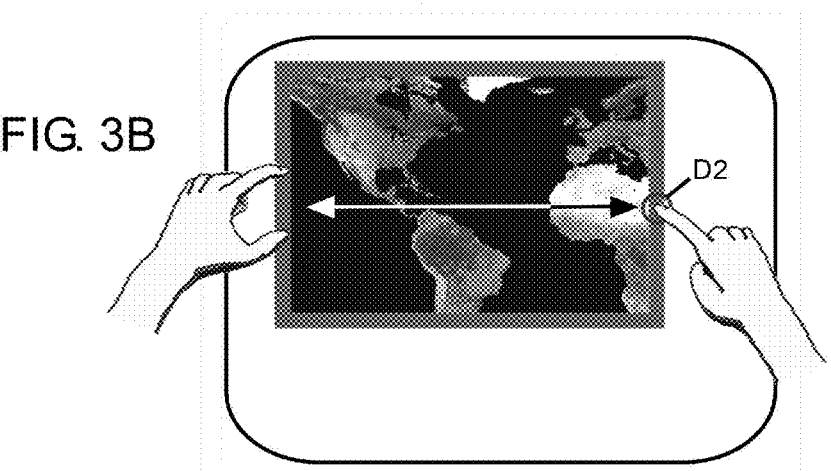
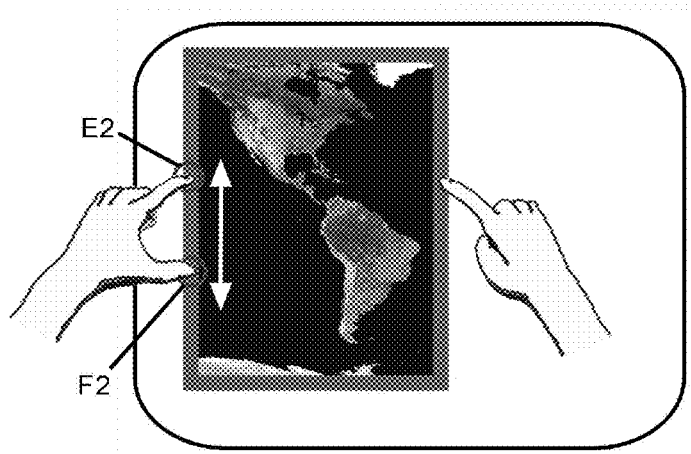
FIG. 3C

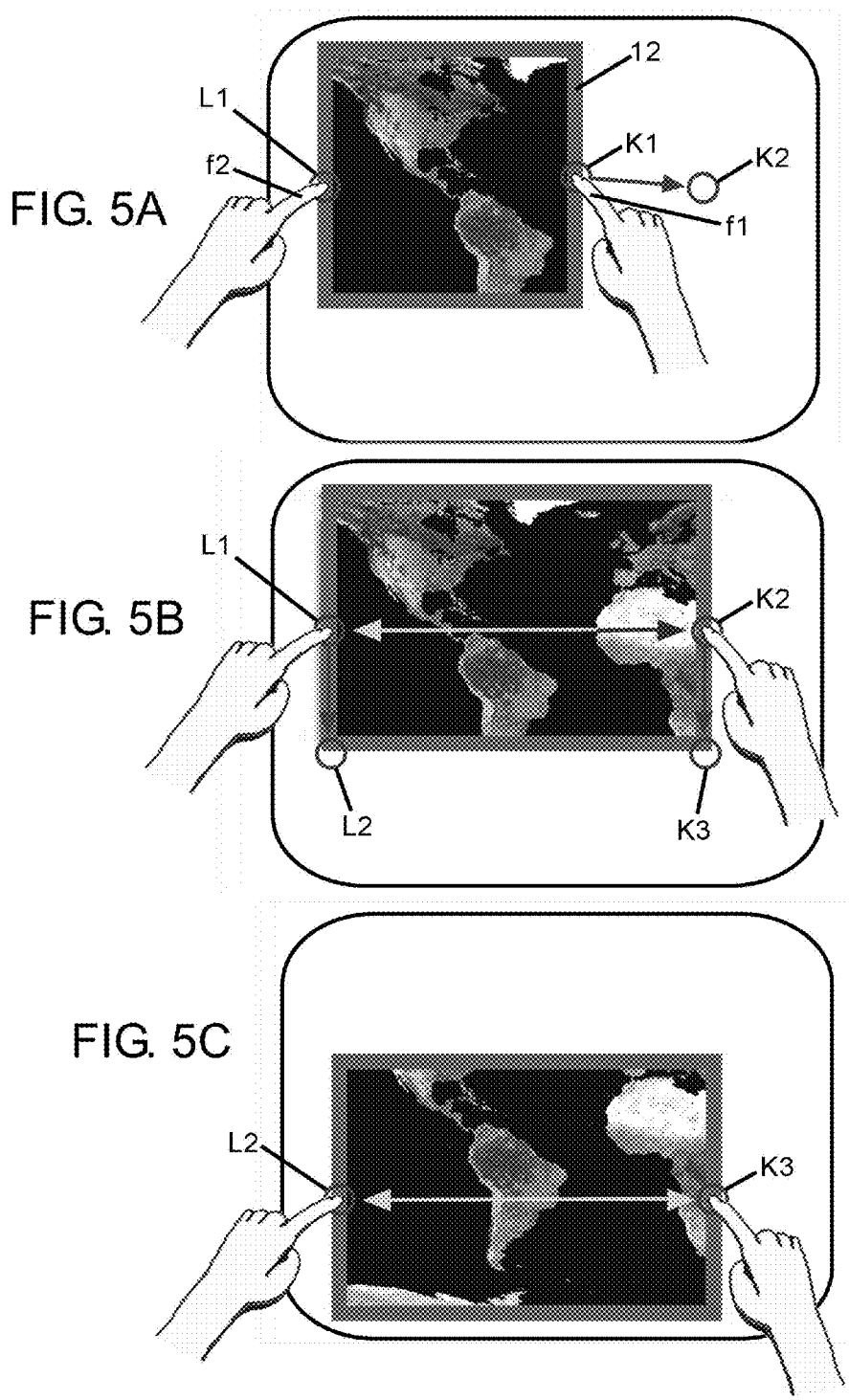

METHODS OF INTERFACING WITH MULTI-INPUT DEVICES AND MULTI-INPUT DISPLAY SYSTEMS EMPLOYING INTERFACING TECHNIQUES

REFERENCE TO RELATED APPLICATION

This application claims priority to U.S. Provisional Patent Application No. 61/043,863, filed Apr. 10, 2008, the disclosure of which is incorporated herein by reference.

BACKGROUND OF THE INVENTION

1. Field of the Invention

The present invention relates to methods of interfacing with multi-input devices, including multi-touch input devices, and multi-input display systems employing interfacing techniques.

2. Description of the Related Art

So-called touch screen displays are well known and common in many industries. As an example, most bank ATMs use touch screen displays. As the utility of these types of displays increases, displays within home and business, including televisions and computer monitors, are increasingly becoming touch sensitive.

Recently, multi-touch input devices are becoming more available for various uses due to advancements in touch sensing technologies, reductions in cost, and other factors. Multi-touch input devices, by definition, are capable of detecting multiple inputs simultaneously. U.S. patent application Ser. Nos. 11/833,908; 12/185,782; 12/182,440; 60/821,325; 60/953,966; and 60/952,709; and U.S. Patent Publication Nos. 2008/0029691A1; 2008/0284925A1; and 2009/0033637A1, all assigned to the assignee of the present application and incorporated herein by reference, identify various technologies and publications within the field, and further describe additional advancements in multi-touch sensing through frustrated total internal reflection.

Interface control technology, including interfacing techniques, has been widely studied. The following publications explore various concepts, methodologies and techniques in this area: Buxton, W., Hill, R., and Rowley, P., "Issues and Techniques in Touch-Sensitive Tablet Input," Proceedings of the 12th Annual Conference on Computer Graphics and Interactive Techniques SIGGRAPH '85, ACM Press, New York, N.Y., 215-224 (1985); Michael Chen, "A Study in Interactive 3-D Rotation Using 2-D Control Devices," Computer Graphics, Vol. 22, No. 4, 121-129 (1988); K. Shoemake, "ARCBALL: A User Interface for Specifying Three-Dimensional Orientation Using a Mouse," Proceedings of the conference on Graphics interface '92, 151-156 (1992); Ken Hinckley, "Haptic Issues for Virtual Manipulation," A Dissertation Presented to the Faculty of the School of Engineering and Applied Science at the University of Virginia, section 6.1-6.3 (1996), from the website http://research.microsoft-.com/Users/kenh/thesis/front.htm; Dietz, P. and Leigh, D., "DiamondTouch: A Multi-User Touch Technology," Proceedings of the 14th Annual ACM Symposium on User Interface Software and Technology (Orlando, Fla., Nov. 11-14, 2001), UIST '01. ACM Press, New York, N.Y., 219-226 (2001); Lee, S., Buxton, W. and Smith, K. C., "A Multi-Touch Three Dimensional Touch-Sensitive Tablet," Proceedings of the SIGCHI Conference on Human Factors in Computing Systems (San Francisco, Calif., United States), CHI '85. ACM Press, New York, N.Y., 21-25 (1985); Malik, S. and Laszlo, J., "Visual Touchpad: A Two-Handed Gestural Input Device," Proceedings of the 6th International Conference on Multimodal Interfaces (State College, Pa., USA, Oct. 13-15, 2004), ICMI '04. ACM Press, New York, N.Y., 289-296 (2004); Rekimoto, J., "SmartSkin: An Infrastructure for Freehand Manipulation on Interactive Surfaces," Proceedings of the SIGCHI Conference on Human Factors in Computing Systems, CHI '02, ACM Press, New York, N.Y., 113-120 (2002); Westerman, W., Elias, J. G., and Hedge, A., "Multi-Touch: A New Tactile 2-D Gesture Interface for Human-Computer Interaction," Proceedings of the Human Factors and Ergonomics Society 45th Annual Meeting (Minneapolis/St. Paul, Minn., October 2001), 632-636 (2001); Wilson, A. D., "TouchLight: An Imaging Touch Screen and Display for Gesture-Based Interaction," Proceedings of the 6th International Conference on Multimodal Interfaces (State College, Pa., USA, Oct. 13-15, 2004), ICMI '04. ACM Press, New York, N.Y., 69-76 (2004); and Wu, M. and Balakrishnan, R., "Multi-Finger and Whole Hand Gestural Interaction Techniques for Multi-User Tabletop Displays," Proceedings of the 16th Annual ACM Symposium on User Interface Software and Technology (Vancouver, Canada, Nov. 2-05, 2003), UIST '03, ACM Press, New York, N.Y., 193-202 (2003), each of which is incorporated herein by reference.

Various publications explore two-handed input. These include: R. Balakrishnan and K. Hinckley, "Symmetric bimanual interaction," CHI '00: Proceedings of the SIGCHI conference on Human factors in computing systems, 33-40 (2000); R. Balakrishnan and G. Kurtenbach, "Exploring bimanual camera control and object manipulation in 3D graphics interfaces," CHI '99: Proceedings of the SIGCHI conference on Human factors in computing systems, 56-63 (1999); Y. Guiard, "Asymmetric division of labor in human skilled bimanual action: The kinetic chain as a model," Journal of Motor Behavior, 19(4):486-517 (1987); K. Hinckley, R. Pausch, J. C. Goble, and N. F. Kassell, "Passive real-world interface props for neurosurgical visualization," CHI '94: Proceedings of the SIGCHI conference on Human factors in computing systems, 452-458 (1994); G. Kurtenbach, G. Fitzmaurice, T. Baudel, and B. Buxton, "The design of a GUI paradigm based on Tablets, Two-hands, and Transparency," CHI '97: Proceedings of the SIGCHI conference on Human factors in computing systems, 35-42 (1997); I. Llamas, B. Kim, J. Gargus, J. Rossignac, and C. D. Shaw, "Twister: a space-warp operator for the two-handed editing of 3D shapes," ACM Transactions on Graphics, 22(3):66 3-668 (2003); and R. Zeleznik, A. Forsberg, and P. Strauss, "Two pointer input for 3D interaction," SI3D '97: Proceedings of the 1997 symposium on Interactive 3D graphics, 115-120 (1997). Each of these publications is incorporated herein by reference.

Recent patent publications in this field further include U.S. Patent Publication Nos. 2006/0026521, 2006/0026535, 2006/0053387, 2006/0085757, 2006/0033724, 2006/0161870, 2006/0161871, and 2006/0026535, each of which is incorporated herein by reference. Moreover, U.S. Patent Publication Nos. 2008/0180404A1, 2008/0180405A1 and 2008/0180406A1, assigned to the assignee of the present application and incorporated fully herein by reference, describe particular advancements in both 2D and 3D object control and 3D globe view control, among other things.

SUMMARY OF THE INVENTION

Human interface techniques that take full advantage of the multi-input capability of multi-input sensing technology need to be developed. It is therefore a general object of the present invention to provide methods and systems for facilitating human interfacing with multi-input technology, such as multi-touch tablets and multi-touch display devices. More specific objects of the present invention are discussed in the detailed description section provided below.

In accordance with the present invention, a method of interfacing with a multi-input display device comprises displaying on a multi-input display device a graphical window and at least a first portion of an image within the graphical window, identifying a number, position and movement of one or more elements contacting the display device, changing a characteristic of the displayed graphical window in accordance with the identified number, position and movement of the one or more elements contacting the display device, the characteristic corresponding to a first characteristic when only one element is identified as contacting the display device, the first characteristic being a position of the displayed graphical window, and the characteristic corresponding to a second characteristic when a plurality of elements are identified as contacting the display device, the second characteristic being at least a shape and/or size of the displayed graphical window. The first and second characteristics are different. The method further comprises displaying on the display device at least a second portion of the image within the graphical window having the changed characteristic, and positions on the display device of common portions of the first and second portions of the image are substantially the same.

In accordance with another embodiment of the present invention, a method of interfacing with a multi-input display device comprises displaying on a multi-input display device a graphical window and at least a first portion of an image within the graphical window, identifying a number, position and movement of a plurality of elements simultaneously contacting the display device, manipulating the displayed graphical window in accordance with one or more modifications, the one or more modifications comprising a first modification implemented when only two elements are identified as contacting the display device at positions on a frame of the displayed graphical window, the first modification changing at least a shape and/or size of the displayed graphical window in accordance with the identified positions and movement of the two elements, a second modification implemented when three elements are identified as contacting the display device at positions on the frame of the displayed graphical window, the second modification changing at least the position, shape and/or size of the displayed graphical window in accordance with the identified positions and movement of the three elements, the first and second modifications being different, displaying on the display device at least a second portion of the image within the manipulated graphical window, and positions on the display device of common portions of the first and second portions of the image being substantially the same.

In accordance with a system embodiment of the present invention, a multi-input display system comprises a display device for displaying on a display surface a graphical window and at least a first portion of an image within the graphical window, the display device adapted to detect one or more elements contacting the display surface, a controller for identifying a number, position and movement of the one or more elements contacting the display surface, and for changing a characteristic of the displayed graphical window in accordance with the identified number, position and movement of the one or more elements contacting the display surface, the characteristic corresponding to a first characteristic when only one element is identified as contacting the display surface, the first characteristic being a position of the displayed graphical window, and the characteristic corresponding to a second characteristic when a plurality of elements are identified as contacting the display surface, the second characteristic being at least the shape and/or size of the displayed graphical window, the first and second characteristics being different, the controller controlling the display device to display on the display surface at least a second portion of the image within the graphical window having the changed characteristic, positions on the display surface of common portions of the first and second portions of the image being substantially the same.

In accordance with another system embodiment of the present invention, a multi-input display system comprises a display device for displaying on a display surface a graphical window and at least a first portion of an image within the graphical window, the display device adapted to detect a plurality of elements simultaneously contacting the display surface, a controller for identifying a number, position and movement of the plurality of elements simultaneously contacting the display surface, and for manipulating the displayed graphical window in accordance with one or more modifications, the one or more modifications comprising a first modification implemented when only two elements are identified as contacting the display surface at positions on a frame of the displayed graphical window, the first modification changing at least the shape and/or size of the displayed graphical window in accordance with the identified positions and movement of the two elements, a second modification implemented when three elements are identified as contacting the display surface at positions on the frame of the displayed graphical window, the second modification changing at least the position, shape and/or size of the displayed graphical window in accordance with the identified positions and movement of the three elements, the first and second modifications being different, the controller controlling the display device to display on the display surface at least a second portion of the image within the manipulated graphical window, and positions on the display surface of common portions of the first and second portions of the image being substantially the same.

For each of the above-summarized embodiments of the present invention, various aspects and features of the present invention may be carried out. Some of these features and aspects are summarized below.

As an aspect of the invention, when two elements are identified as contacting the display device initially at positions on the displayed graphical window, the size of the displayed graphical window is uniformly scaled in accordance with the identified movement of the two elements.

As a further aspect of the invention, when two elements are identified as contacting the display device initially at positions on the displayed graphical window, the displayed graphical window is moved and sized in accordance with the identified movement of the two elements.

As a feature of this aspect, the displayed graphical window is rotated in accordance with changes in orientation of the identified positions of the two elements relative to one another.

As an additional aspect of the invention, when three elements are identified as contacting the display device initially at positions on a frame of the displayed graphical window, the shape of the displayed graphical window is manipulated based on changes in the identified positions of the three elements in accordance with a best-fit methodology.

As a feature of this aspect, manipulation of the shape of the displayed graphical window is a 5-degree of freedom operation.

As yet another aspect of the invention, when first and second elements are identified as contacting the display device initially at positions on a first edge of a frame of the displayed graphical window and a third element is identified as contacting the display device initially at a position on a second edge opposite the first edge of the frame of the displayed graphical window, the displayed graphical window is manipulated based on the movement of one or more of the first, second and third elements.

As yet an additional aspect of the invention, the shape of the displayed graphical window is modified by moving the first edge of the frame of the displayed graphical window in alignment with identified joint movement of the first and second elements and the second edge of the frame is held in alignment with the identified position of the third element.

As another aspect of the invention, the second edge of the frame of the displayed graphical window is moved in alignment with the identified movement of the third element and the first edge of the frame is maintained at a fixed position.

As a further aspect of the invention, the length of the first and second edges of the frame of the displayed graphical window are changed in accordance with a change in distance between the identified positions of the first and second elements.

As an additional aspect of the invention, the displayed graphical window is rotated in accordance with changes in orientation of the identified positions of the first and second elements relative to one another so that the first edge of the frame of the displayed graphical window is aligned with an axis extending through the first and second elements as the first and second elements move.

As yet a further aspect of the invention, the displayed graphical window is rectangular in shape, and manipulating the displayed graphical window comprises aligning the first edge of the frame of the displayed graphical window with an axis extending through the identified positions of the first and second elements, aligning the first edge (including remaining stationary, moving vertically, moving horizontally, or rotating), changing a length of the first and second edges of the frame in accordance with a change in distance between the identified positions of the first and second elements, and aligning the second edge of the frame with the identified position of the third element.

In accordance with a further method embodiment of the present invention, a method of interfacing with a multi-input display device comprises displaying on a multi-input display device a graphical window and at least a first portion of an image within the graphical window, identifying a position and movement of one element contacting an edge of the displayed graphical window or a plurality of elements simultaneously contacting respectively different edges of the displayed graphical window, manipulating the displayed graphical window in accordance with one or more modifications, the one or more modifications comprising a first modification implemented when only one element is contacting an edge of the displayed graphical window, the first modification moving the edge of the displayed graphical window contacted by the element in a direction of identified movement of the one element normal to an axis of the edge, a second modification implemented when a plurality of elements are simultaneously contacting respectively different edges of the displayed graphical window, the second modification simultaneously moving each of the edges of the displayed graphical window contacted by a respective one of the elements in a direction of identified movement of the respective element normal to an axis of the respective edge, displaying on the display device at least a second portion of the image within the manipulated graphical window, and positions on the display device of common portions of the first and second portions of the image being substantially the same.

In accordance with a further system embodiment of the present invention, a multi-input display system comprises a display device for displaying on a display surface a graphical window and at least a first portion of an image within the graphical window, the display device adapted to detect one or more elements contacting the display surface, a controller for identifying a position and movement of one element contacting an edge of the displayed graphical window or a plurality of elements simultaneously contacting respectively different edges of the displayed graphical window, the controller adapted to manipulate the displayed graphical window in accordance with one or more modifications, the one or more modifications comprising a first modification implemented when only one element is contacting an edge of the graphical window, the first modification moving the edge of the graphical window contacted by the element in a direction of identified movement of the one element normal to an axis of the edge, a second modification implemented when a plurality of elements are simultaneously contacting respectively different edges of the graphical window, the second modification simultaneously moving each of the edges of the graphical window contacted by a respective one of the elements in a direction of identified movement of the respective element normal to an axis of the respective edge, the controller controlling the display device to display on the display surface at least a second portion of the image within the manipulated graphical window, positions on the display surface of common portions of the first and second portions of the image being substantially the same.

As an aspect of these further method and system embodiments, a position and movement of three or more elements simultaneously contacting three or more different edges of the displayed graphical window are identified, and the second modification simultaneously moves each of the three or more edges of the displayed graphical window contacted by the three or more elements in a respective direction of the identified movement of the respective element normal to an axis of the respective edge.

In accordance with an additional method embodiment of the present invention, a method of interfacing with a multi-input display device comprises displaying on a multi-input display device a graphical window and at least a first portion of an image within the graphical window, identifying positions and movement of a plurality of elements simultaneously contacting one or more edges of the displayed graphical window, manipulating the displayed graphical window in accordance with one or more modifications, the one or more modifications comprising a first modification implemented when two of the plurality of elements are contacting opposite edges of the displayed graphical window, the first modification changing at least the position and/or shape of the displayed graphical window in accordance with the identified positions and movement of the two elements contacting the opposite edges, a second modification implemented when two of the plurality of elements are contacting adjacent edges of the displayed graphical window, the second modification changing at least the shape and/or size of the displayed graphical window in accordance with the identified positions and movement of the two elements contacting the adjacent edges, a third modification implemented when two of the plurality of elements are contacting a same edge of the displayed graphical window, the third modification changing at least the position and/or shape of the displayed graphical window in accordance with the identified positions and movement of the two elements contacting the same edge, displaying on the display device at least a second portion of the image within the manipulated graphical window, and positions on the display device of common portions of the first and second portions of the image being substantially the same.

In accordance with an additional system embodiment of the present invention, a multi-input display system comprises a display device for displaying on a display surface a graphical window and at least a first portion of an image within the graphical window, the display device adapted to detect elements simultaneously contacting the display surface, a controller for identifying positions and movement of a plurality of elements simultaneously contacting one or more edges of the displayed graphical window, and for manipulating the displayed graphical window in accordance with one or more modifications, the one or more modifications comprising a first modification implemented when two of the plurality of elements are contacting opposite edges of the displayed graphical window, the first modification changing at least the position and/or shape of the displayed graphical window in accordance with the identified positions and movement of the two elements contacting the opposite edges, a second modification implemented when two of the plurality of elements are contacting adjacent edges of the displayed graphical window, the second modification changing at least the shape and/or size of the displayed graphical window in accordance with the identified positions and movement of the two elements contacting the adjacent edges, a third modification implemented when two of the plurality of elements are contacting a same edge of the displayed graphical window, the third modification changing at least the position and/or shape of the displayed graphical window in accordance with the identified positions and movement of the two elements contacting the same edge, the controller controlling the display device to display on the display surface at least a second portion of the image within the manipulated graphical window, positions on the display surface of common portions of the first and second portions of the image being substantially the same.

For each of the above-summarized additional method and system embodiments of the present invention, various aspects and features of such embodiments may be carried out in accordance with the present invention. Some of these features and aspects are summarized below.

As an aspect of such embodiments of the present invention, the first modification comprises changing the shape of the displayed graphical window by positioning a first of the opposite edges of the displayed graphical window to align with the identified position of a first of the two elements contacting opposite edges, and by positioning a second of the opposite edges of the displayed graphical window to align with the identified position of a second of the two elements contacting opposite edges.

As another aspect of such embodiments, the first modification comprises changing the vertical or horizontal position of the displayed graphical window on the display device in accordance with a change in an axis defined by the positions of the two elements contacting the opposite edges.

As a further aspect of such embodiments, the second modification comprises uniformly scaling the size of the displayed graphical window in accordance with the identified movement of the two elements contacting the adjacent edges.

As yet another aspect of such embodiments, the third modification comprises changing the shape of the displayed graphical window by changing a length of said same edge in accordance with a change in distance between the positions of the two elements contacting the same edge.

In accordance with yet a further method embodiment of the present invention, a method of interfacing with a multi-input display device comprises displaying on a multi-input display device a graphical window and a first portion of an image within the graphical window, the displayed graphical window having an inner frame and an outer frame, identifying an initial position of one or more elements contacting the inner frame or the outer frame of the displayed graphical window, identifying a movement of the one or more elements, changing at least the position, shape and/or size of the displayed graphical window as a function of the initial position and movement of the one or more elements, manipulating the image displayed within the displayed graphical window in accordance with one or more modifications, the one or more modifications comprising a first modification implemented when the initial position of the one or more elements is identified as contacting the inner frame or the outer frame of the displayed graphical window, the first modification comprising manipulating the image displayed by displaying a second portion of the image within the changed graphical window, and positions on the display device of common portions of the first and second portions of the image being substantially the same, and, a second modification implemented when the initial position of the one or more elements is identified as contacting the other frame of the displayed graphical window, the second modification comprising manipulating the image displayed by changing the first portion of the image in a same manner the displayed graphical window is changed and displaying the changed first portion of the image within the changed graphical window.

In accordance with yet a further system embodiment of the present invention, a multi-input display system comprises a display device for displaying on a display surface a graphical window and a first portion of an image within the graphical window, the display device adapted to detect elements simultaneously contacting the display surface, the displayed graphical window having an inner frame and an outer frame, a controller adapted to identify an initial position of one or more elements contacting the inner frame or the outer frame of the displayed graphical window, to identify a movement of the one or more elements, to change at least the position, shape and/or size of the displayed graphical window as a function of the identified initial position and movement of the one or more elements, and to manipulate the image displayed within the displayed graphical window in accordance with one or more modifications, the one or more modifications comprising a first modification implemented when the initial position of the one or more elements is identified as contacting the inner frame or the outer frame of the displayed graphical window, the first modification comprising manipulating the image displayed by controlling the display device to display a second portion of the image within the changed graphical window, and positions on the display surface of common portions of the first and second portions of the image being substantially the same, a second modification implemented when the initial position of the one or more elements is identified as contacting the other frame of the displayed graphical window, the second modification comprising manipulating the image displayed by changing the first portion of the image in a same manner the displayed graphical window is changed and controlling the display device to display the changed first portion of the image within the changed graphical window.

For each of the above-summarized further method and system embodiments of the present invention, various aspects and features of such embodiments may be carried out in accordance with the present invention. Some of these features and aspects are summarized below.

As an aspect of these embodiments, the first modification is implemented when the initial position of an initial one of plural elements is identified as contacting the inner frame or the outer frame of the displayed graphical window, and the second modification is implemented when the initial position of the initial element is identified as contacting the other one of the inner frame or the outer frame of the displayed graphical window.

As another aspect of these embodiments, the number of elements contacting the inner frame or the outer frame of the displayed graphical window is identified, and a characteristic of the displayed graphical window is changed, the characteristic corresponding to a first characteristic when only one element is identified as contacting the inner frame or the outer frame of the displayed graphical window, the first characteristic being a position of the displayed graphical window on the display device, and the characteristic corresponding to a second characteristic when a plurality of elements are identified as contacting the inner frame or the outer frame of the displayed graphical window, the second characteristic being at least the shape and/or size of the displayed graphical window, the first and second characteristics being different.

As a further aspect of these embodiments, the number of elements contacting the inner frame or the outer frame of the displayed graphical window is identified, and the displayed graphical window is changed in accordance with one or more graphical window modifications, the one or more graphical window modifications comprising a first graphical window modification implemented when only two elements are identified as contacting the inner frame or the outer frame of the displayed graphical window, the first graphical window modification changing at least the shape and/or size of the displayed graphical window as a function of the identified initial positions and movement of the two elements, and a second graphical window modification implemented when three elements are identified as contacting the inner frame or the outer frame of the displayed graphical window, the second graphical window modification changing at least the position, shape and/or size of the displayed graphical window as a function of the identified initial positions and movement of the three elements, the first and second graphical window modifications being different.

As another aspect of these embodiments, the number of elements contacting the inner frame or the outer frame of the displayed graphical window is identified, and the displayed graphical window is changed in accordance with one or more graphical window modifications, the one or more graphical window modifications comprising a first graphical window modification implemented when only one element is identified as contacting the inner frame or the outer frame of the displayed graphical window, the first graphical window modification moving an edge of the displayed graphical window contacted by the one element in a direction of identified movement of the one element normal to an axis of the edge, a second graphical window modification implemented when a plurality of elements are identified as contacting the inner frame or the outer frame of the displayed graphical window along different edges of the displayed graphical window, the second graphical window modification moving each of the edges of the displayed graphical window contacted by a respective one of the elements in a direction of identified movement of the respective element normal to an axis of the respective edge.

As a further aspect of these embodiments, the displayed graphical window is changed in accordance with one or more graphical window modifications, the one or more graphical window modifications comprising a first graphical window modification implemented when two elements are identified as contacting opposite edges of the displayed graphical window, the first graphical window modification changing at least the position and/or shape of the displayed graphical window in accordance with the positions and movement of the two elements contacting the opposite edges, a second graphical window modification implemented when two elements are identified as contacting adjacent edges of the displayed graphical window, the second graphical window modification changing at least the shape and/or size of the displayed graphical window in accordance with the positions and movement of the two elements contacting the adjacent edges, a third graphical window modification implemented when two elements are identified as contacting a same edge of the displayed graphical window, the third graphical window modification changing at least the position and/or shape of the displayed graphical window in accordance with the positions and movement of the two elements contacting the same edge.

In accordance with an additional method embodiment of the present invention, a method of interfacing with a multi-input display device comprises displaying on a multi-input display device at least first and second graphical windows, displaying a first portion of an image within the first graphical window, displaying a second portion of the image within the second graphical window, the first portion and the second portion representing at least portions of the same image, identifying a number, position and movement of a first element or a first plurality of elements contacting the displayed first graphical window, identifying a number, position and movement of a second element or a second plurality of elements contacting the displayed second graphical window, manipulating the displayed first graphical window as a function of the identified number, position and movement of the first element or the first plurality of elements contacting the first graphical window, manipulating the displayed second graphical window as a function of the identified number, position and movement of the second element or the second plurality of elements contacting the second graphical window, displaying on the display device, upon manipulating the first graphical window, at least a third portion of the image within the manipulated first graphical window, and positions on the display device of common portions of the first and third portions of the image being substantially the same, and displaying on the display device, upon manipulating the second graphical window, at least a fourth portion of the image within the manipulated second graphical window, and positions on the display device of common portions of the second and fourth portions of the image being substantially the same.

In accordance with an additional system embodiment of the present invention, a multi-input display system comprises a display device for displaying on a display surface at least first and second graphical windows, for displaying a first portion of an image within the first graphical window, and for displaying a second portion of the image within the second graphical window, the first portion and the second portion representing at least portions of the same image, the display device adapted to detect one or more elements contacting the display surface, a controller adapted to identify a number, position and movement of a first element or a first plurality of elements contacting the displayed first graphical window, to identify a number, position and movement of a second element or a second plurality of elements contacting the displayed second graphical window, to manipulate the displayed first graphical window as a function of the identified number, position and movement of the first element or the first plurality of elements contacting the first graphical window, to manipulate the displayed second graphical window as a function of the identified number, position and movement of the second element or the second plurality of elements contacting the second graphical window, to control the display device to display on the display surface, upon manipulating the first graphical window, at least a third portion of the image within the manipulated first graphical window, positions on the display surface of common portions of the first and third portions of the image being substantially the same, and to control the display device to display on the display surface, upon manipulating the second graphical window, at least a fourth portion of the image within the manipulated second graphical window, positions on the display surface of common portions of the second and fourth portions of the image being substantially the same.

For the above-summarized additional method and system embodiments of the present invention, various aspects and features of such embodiments may be carried out in accordance with the present invention. Some of these features and aspects are summarized below.

As an aspect of such embodiments, the displayed first and second graphical windows have an overlapping region, and a part of the image displayed within the overlapping region represents at least a part of the first portion displayed within the first graphical window and also represents at least a part of the second portion displayed within the second graphical window.

As another aspect of such embodiments, the overlapping region is displayed with content having a predefined characteristic and non-overlapping region or regions of the first and second graphical windows are displayed with content not having the predefined characteristic.

As a further aspect of such embodiments, the image represents a map, a first portion of the map is displayed in the overlapping region at a first resolution and a second portion or portions of the map are displayed in a non-overlapping region(s)s at a second resolution, the first and second resolutions being substantially different.

As an additional aspect of the invention, the image represents a map, a first portion of the map having real time traffic data is displayed within the overlapping region, and a second portion or portions of the map not having real time traffic data are displayed within a non-overlapping region or regions of the first and second graphical windows.

As yet a further aspect of the invention, the image represents a photograph, a first portion of the photograph having an image enhancement characteristic is displayed within the overlapping region, and a second portion or portions of the map not having the image enhancement characteristic are displayed within a non-overlapping region or regions of the first and second graphical windows.

As yet another aspect of the invention, the image represents information containing hidden data, a first portion of the image is displayed within the overlapping region and at least a portion of the hidden data is revealed within the overlapping region, and a second portion or portions of the image are displayed within a non-overlapping region or regions of the first and second graphical windows and the non-overlapping region or regions do not reveal any of the hidden data.

As yet a further aspect of the invention, the first and second graphical windows are displayed with an overlapping region and respective non-overlapping regions. A portion of the image with a first characteristic is displayed within the overlapping region, a portion of the image with a second characteristic is display within the non-overlapping region of the displayed first graphical window, and a portion of the image with a third characteristic is display within the non-overlapping region of the displayed second graphical window. The first, second and third characteristics are different from one another.

As another aspect of the invention, the displayed first and second graphical windows have an overlapping region and at least the first graphical window has a non-overlapping region, and a part of the image displayed within the entire second graphical window is displayed in accordance with a predefined characteristic, and a part of the image displayed within the non-overlapping region of the first graphical window is displayed not in accordance with the predefined characteristic.

As a further aspect of the invention, at least the shape and/or size of both the first and second graphical windows are uniformly changed as a function of the position and movement of elements contacting both the first and second graphical windows.

As an additional aspect of the invention, portions of the image displayed within the manipulated first and second graphical windows are manipulated in a same manner the first and second graphical windows are changed.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 3A to 3F are schematic illustrations used to describe operations for controlling a window frame using three fingers in accordance with the first embodiment of the present invention;

FIGS. 5A to 5C are schematic illustrations used to describe operations for controlling a window frame with fingers contacting opposite edges of the window frame in accordance with a third embodiment of the present invention;

DETAILED DESCRIPTION OF THE INVENTION

Figure 1A:
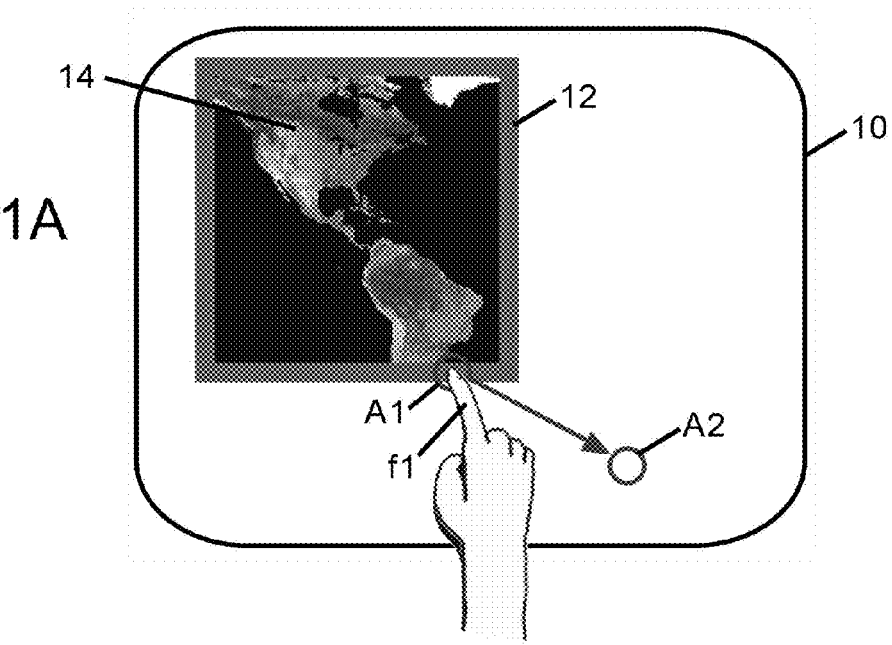
FIGS. 1A and 1B are schematic illustrations used to describe operations/techniques for controlling a window frame using one finger in accordance with a first embodiment of the present invention.

The present invention pertains to techniques for interfacing with multi-input devices, including multi-input displays, multi-touch displays/screens, multi-input capable touch tablets, multi-input devices that receive inputs via one or more fingers of a user and/or via one or more styluses or other mechanical, electro-mechanic, magnetic, etc., devices, and any other device or apparatus capable of sensing simultaneous multiple inputs. The multi-input displays/screens may be in the form of a computer monitor, a television, a telephone display, a personal digital assistant, and other such devices, whether portable or stationary. Moreover, multiple devices, such as two or more computer monitors, may operate together to display collectively an image or images to a user or users and, thus, the multi-input displays/screens may entail multiple devices/systems. As used herein, the terms "multi-input device" or "multi-input display device" (or, for convenience herein, "display device" or "input device") are interchangeably used herein and shall refer to any of the above-mentioned devices including multiple units thereof or combinations of such devices. In addition, for convenience, the present invention is described in connection with an input device or display device receiving one or more inputs in the form of a user's finger or fingers contacting the input device. It is appreciated, however, that other forms of inputs may be employed, such as via a stylus as mentioned above. Accordingly, the terms "finger" and "element" are interchangeably used herein to refer to any item (i.e., element) contacting the display device in accordance with the present invention.

The present invention pertains, in particular, to a user interface windowing system. As further described below and with particular reference to the drawing figures, the present invention provides various techniques for controlling, including moving, sizing, orientating, among other things, one or more windows in which an image or images are displayed. As discussed and shown in the various embodiments set forth herein, the window corresponds to a window frame through which (or in which) an image is provided and wherein parts of the image that extend beyond the window frame are not displayed. As described in detail below, the present invention is a user interface for controlling the windowing (or window framing) of images.

Multi-Touch Enabled Rectilinear Window Frame Style 1

FIGS. 1A-1B, 2A-2B, and 3A-3C schematically describe a first embodiment for controlling a window frame by employing both single and multi-touch techniques as herein described. For convenience only, the first embodiment is referred to herein as window frame style 1. In accordance with the present invention, window frame style 1 operates in different manners depending on the number of contact points (e.g., number of user fingers employed), the relative positions of those contacts and the relative movement of those contact points.

FIG. 1A of the drawings shows a display device 10 that displays an image of a window 12 (also called "window frame") in which an image 14 (sometimes referred to herein as a "picture") is provided. Conceptually, picture 14 extends beyond window 12, but only that portion disposed within window 12 is displayed. Window frame style 1 includes controlling the position of window 12 by moving a single contact point (e.g., using a single finger f1). In particular, sliding one contact point from position A1 to a different position A2, as schematically shown in FIG. 1A, moves window 12 from the position shown in FIG. 1A to the position shown in FIG. 1B. However, as shown, the position of picture 14 remains stationary relative to the display device 10 and thus the actual image displayed when the window is at one position differs from the image displayed when the window is at a different position.

Figure 1B:
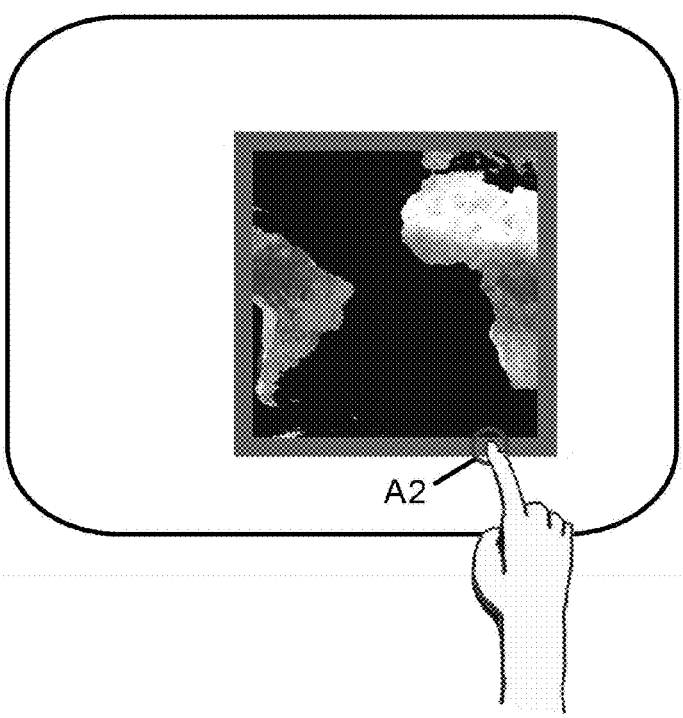

Stated differently, a first portion of an image is displayed within the window when the window is located at one position (e.g., see FIG. 1A), and a second portion of that same image is displayed within the window when the window is at a different position (e.g., see FIG. 1B). But the entire image (which usually is not displayed in its entirety) remains stationary relative to the display device and, thus, positions on the display device of the common portions of the above-mentioned first and second portions are the same.

The picture 14 shown in the exemplary figures is a well-recognized image of the Earth and is shown in the figures to facilitate an understanding of the various embodiments and features of the present invention. However, any picture or image, including text, may be displayed within the window.

As mentioned above, and with reference again to FIGS. 1A and 1B, it is seen that moving window 12 does not move the displayed image 14 relative to the display device 10. Accordingly, the present invention is well-suited for mapping, editing and other useful graphical functions.

Figure 2A:
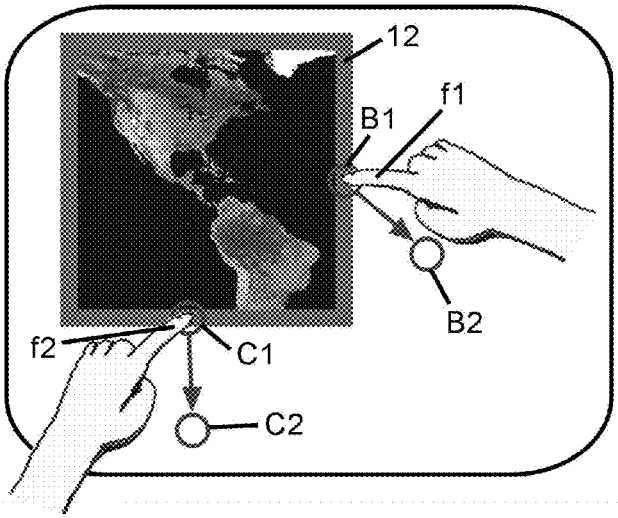
FIGS. 2A and 2B are schematic illustrations used to describe operations for controlling a window frame using two fingers in accordance with the first embodiment of the present invention.
Figure 2B:
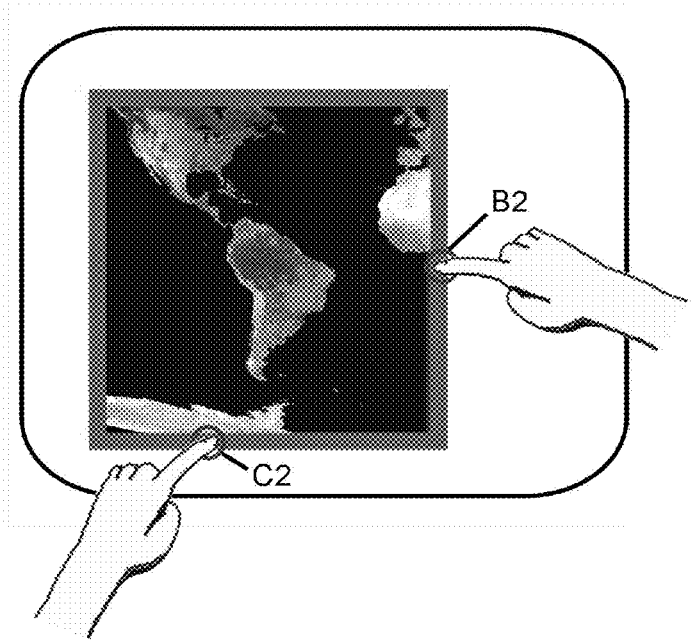
Figure 3D:
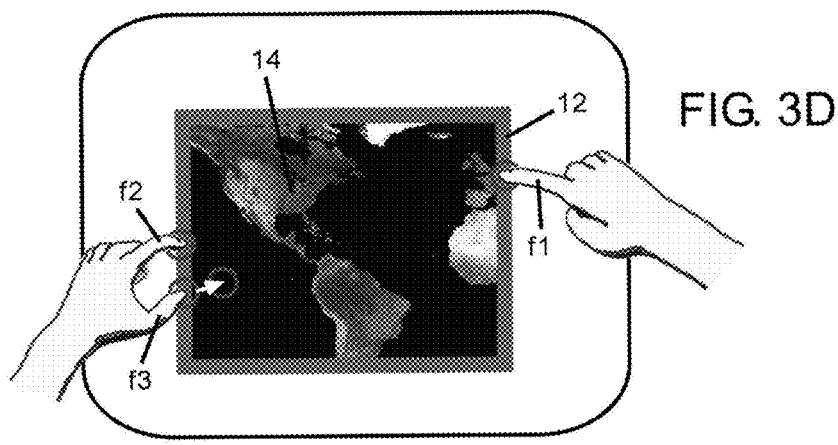
Figure 3E:
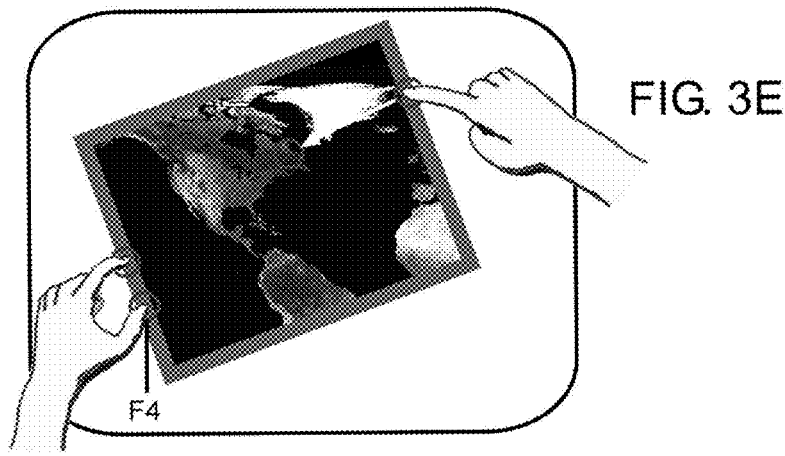

Window frame style 1 further includes controlling window 12 by using two points of contact (e.g., first and second fingers f1 and f2), as illustrated in FIGS. 2A and 2B. In particular, employing two points of contact moves and uniformly scales window 12. But, as with one finger control, picture 14 remains stationary relative to display device 10 during two-finger control. As shown in FIG. 2A, finger f1 slides from contact point B1 to contact point B2 while finger f2 slides from contact point C1 to contact point C2. Fingers f1 and f2 may move simultaneously with one another or in succession. As window 12 increases in size, the amount of image 14 that is displayed also increases, as shown in FIG. 2B. Window rotation may also, optionally, be simultaneously controlled using fingers f1 and f2 (e.g., see FIGS. 3D and 3E discussed below). It is appreciated that while FIGS. 3D and 3E show two fingers disclosed on a single edge controlling window rotation, rotation may be implemented via multiple fingers disposed at different positions, such as on adjacent edges. Hence, two input points (e.g., two fingers) may be utilized to effect the position, scaling and rotation, that is, pan-zoom-rotate (or "PZR") of a window or, in other words, implement rotation, scale and translation ("RST") control of window 12 using two points of contact. In certain applications, it may be desirable to disable rotation so that the window edges are always axis-aligned, which may be the case for any of the embodiments and variations thereof described herein.

Three points of contact may control a window, in accordance with the present invention, by applying a "best effort" or "best fit" methodology to the manipulation of the window frame. In particular, the coordinates of a rectangular window frame are computed to best fit the dynamic positions of three (or more) fingers. As shown in the examples discussed below, three input points (e.g., three fingers) may be utilized to effect the position, non-uniform (i.e. anisotropic, axis-independent) scaling and rotation (i.e., a 5 degree of freedom (5 DOF) operation) of a window on a display based on a change from the initial positions of the points or based incrementally on changes in the positions of the points. In a particular implementation, two fingers disposed on one edge of the window, for example, the left edge, locks that edge to the positions of those two fingers, with a third finger disposed on an opposite edge to control that edge. Subsequently moving one or more fingers in turn enables the window to move, scale or rotate accordingly.

FIGS. 3A-3C illustrate how the respective positions/lengths of window 12's edges may be controlled or, in other words, how the width and/or the height of window 12, along with the window's position, may be controlled utilizing first, second and third fingers f1, f2 and f3. Finger f1 is disposed on a first window edge and fingers f2 and f3 are disposed on an opposite window edge to trigger 3-point of contact window control. The width of window 12 increases (or decreases) (or, stated differently, the position of the window's right edge moves) as finger f1 moves horizontally. In FIG. 3A, finger f1 moves from contact point D1 to contact point D2, thereby causing the right edge of window 12 to extend to contact point D2, as shown in FIG. 3B. Moving horizontally fingers f2 and f3, contacting the same window edge, similarly controls the horizontal position of that edge. In a variation, placement of two fingers on the same edge locks that edge in position, so that only the opposite edge moves horizontally when the finger contacting that edge (e.g., finger f1) moves horizontally. In another variation, the edge on which a single finger is contacting is locked in position, with the horizontal position of the opposite edge being controlled by the other two fingers.

Height control of the window and/or the vertical position of the window (i.e., the respective positions of the upper and lower edges) similarly is achieved, along with the variations mentioned above, by employing three contact points on the upper and lower edges of the window.

In a further variation, fingers f2 and f3, contacting the same window edge as shown in FIG. 3A, control the window's height (i.e., controls the distance between the edges not being contacted) as a function of the relative change in distance between those fingers. For example, sliding fingers f2 and f3 from their initial respective contact points E1 and F1 to respective contact points E2 and F2, as shown in FIG. 3A, causes the height of window frame 12 to increase in proportion to the proportional increase in the distance between the fingers f2 and f3, such as shown in FIG. 3C.

In a variation, the horizontal position of the window's left edge shown in the figures (i.e., the edge with two points of contact) is locked so that only window height is controlled by moving fingers f2 and f3. In another variation, the second and third fingers control both the horizontal position of the edge being contacted and the relative distance between the adjacent edges (i.e., the upper and lower edges). Two points of contact on either the upper or lower window edges similarly controls the vertical position of that edge and/or the relative distance between the window's two side edges.

In accordance with the present invention, the window may be rotated as schematically illustrated in FIGS. 3D and 3E. As shown in FIG. 3D, fingers f2 and f3 initially contact the same window edge thereby locking that edge of the window to the axis that extends through the contact positions of fingers f2 and f3. As finger f2 and/or finger f3 moves, the window edge follows the axis that extends through the fingers' contact points, as shown in FIG. 3E.

Figure 3F:
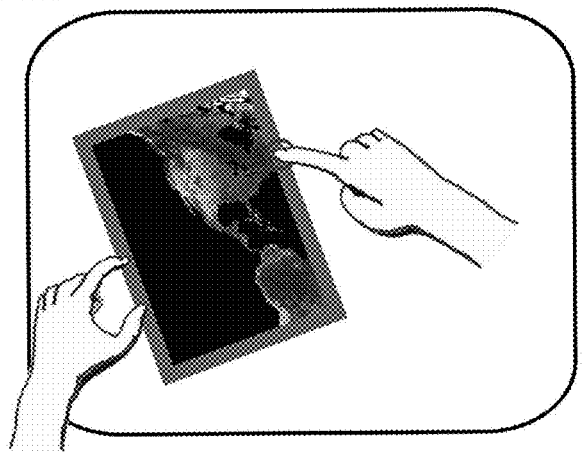

FIGS. 3E and 3F collectively illustrate that the window's size may be controlled after the window has been rotated. The window's size, as well as its position, may also be controlled simultaneously while (or prior to) the window is rotated. For example, extending and rotating two fingers contacting the same window edge both rotates that window edge and extends the window's size along that axis. Moving a third finger on, for example, the opposite window edge further simultaneously increases the window's size accordingly, as previously discussed. Multiple other forms of simultaneous control of window position, size and angular position (anisotropic RST control) also are possible by employing the herein-described control techniques.

The above-described techniques may be implemented, in accordance with the present invention, by having two points of contact (e.g., fingers f2 and f3) on one of the window's edges in order to control the position/scale/rotation of the line segment that corresponds to (i.e., represents) that edge. In other words, the two points that delineate this line segment are directly controlled by two points of contact. The third point of contact (e.g., finger f1) then uniquely specifies a line that is parallel to this line segment, with such specified line representing the window's opposite edge. These two line segments, fully controlled by the three points of contact, then specify the rectangular-shaped window.

Multi-Touch Enabled Rectilinear Window Frame Style 2

Figure 4A:
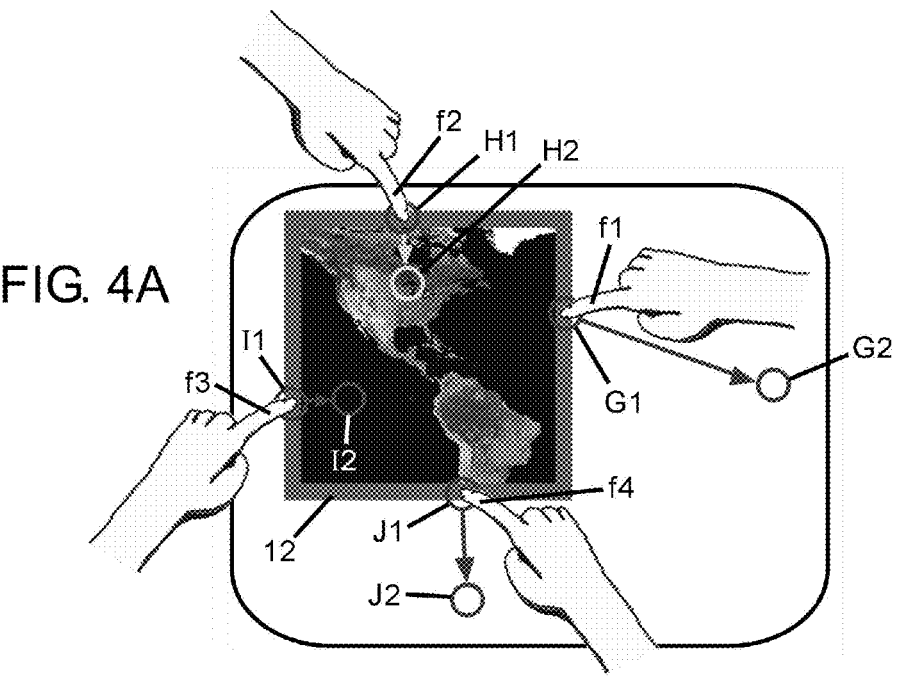
FIGS. 4A and 4B are schematic illustrations used to describe operations for controlling a window frame in accordance with a second embodiment of the present invention.
Figure 4B:
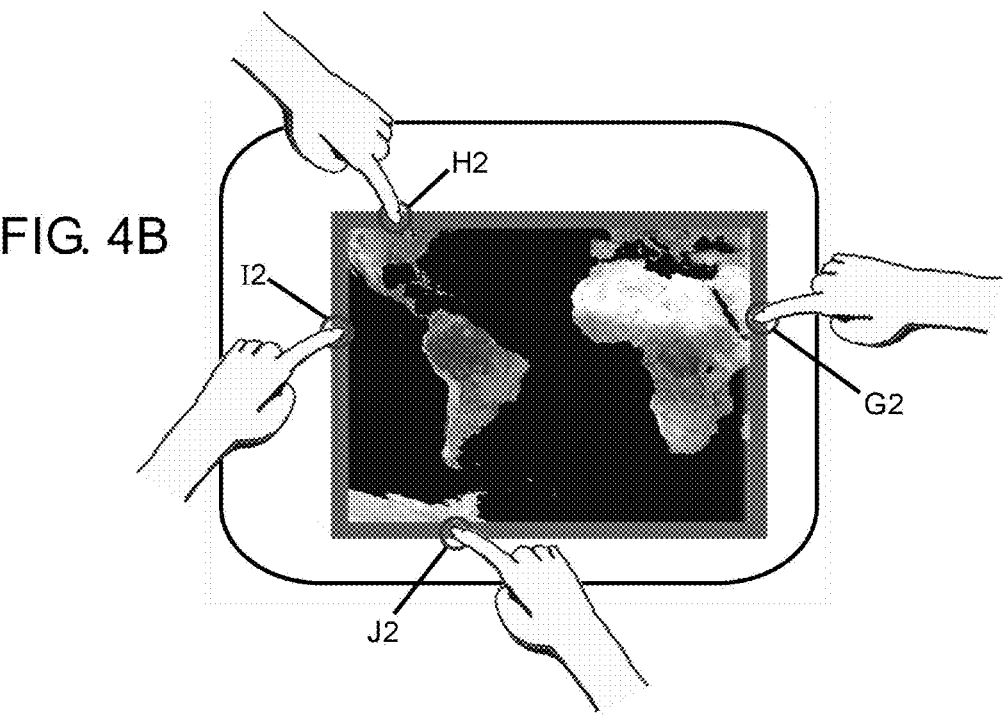

FIGS. 4A-4B schematically show a second embodiment for controlling a window frame, wherein each contact point on an edge adjusts that edge along a direction normal to it. For example, four fingers f1, f2, f3 and f4 are shown in FIG. 4A contacting four different edges of window 12. Moving any finger in a direction normal to the axis of that edge (e.g., while holding another finger on another edge) moves that edge in the direction of movement of the finger. In FIG. 4A, finger f1 slides from contact point G1 to contact point G2 (e.g., while finger f3 remains at position I1), thus causing the window's right edge to move toward the right as shown in FIG. 4B. Similarly, moving finger f2 down from contact point H1 to contact point H2 (e.g., while finger f4 remains in position J1) causes the window's top edge to move down. Moving fingers f3 and f4 likewise control the respective positions of the window's left and bottom edges.

In window frame style 2, the position of each and every edge of the window is controlled separately by moving a finger (or other contact item) contacting that edge (e.g., relative to a finger contacting an opposite edge). A single edge may be controlled with a single finger. Two edges may be controlled simultaneously or in succession with two fingers. Likewise, three or four edges may be controlled simultaneously or in succession with three or four fingers, respectively.

Multi-Touch Enabled Rectilinear Window Frame Style 3

FIGS. 5A-5C, 6A-6B, and 7A-7C schematically show a third embodiment for controlling a window frame, referred to herein for convenience as window frame style 3. In window frame style 3, the user may control the window as herein described by utilizing one, two or three points of contact (e.g., one, two or three fingers). A single point of contact moves the window frame in the same manner as previously described above with reference to FIGS. 1A and 1B.

Two points of contact control the window frame in various different manners depending upon the particular edges each of the two fingers contacts. FIGS. 5A-5C schematically illustrate window frame control when two points of contact (e.g., fingers f1 and f2) are disposed on opposite edges of window 12. In this initial configuration, the two contact points adjust the window to maintain distance and position along the axis that is defined by the two points of contact. More specifically, two points of contact (e.g., fingers f1 and f2) initially are disposed on contact points K1 and L1, as shown in FIG. 5A. Sliding finger f1 from contact point K1 to contact point K2 moves the axis on which finger f1 is disposed horizontally to contact point K2, as shown in FIG. 5B. In addition, the position of the axis as defined by the two contact points controls the vertical position of the window or, in other words, the vertical position of the axis defined by the two points of contact. For example, moving fingers f1 and f2 from contact points K2 and L1, respectively, as shown in FIG. 5B, to contact points K3 and L2 causes window 12 to follow such movement and to move down the display to the position shown in FIG. 5C. Placing two contact points on the upper and lower edges of the window and subsequent movement of these contact points similarly controls the height and horizontal position of window 12 within the display.

Figure 6A:
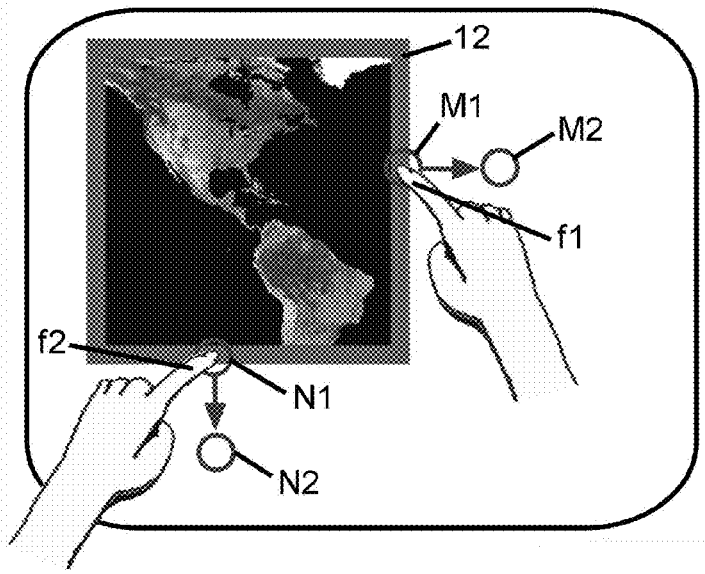
FIGS. 6A and 6B are schematic illustrations used to describe operations for controlling a window frame with fingers contacting adjacent edges of the window frame in accordance with the third embodiment of the present invention.
Figure 6B:
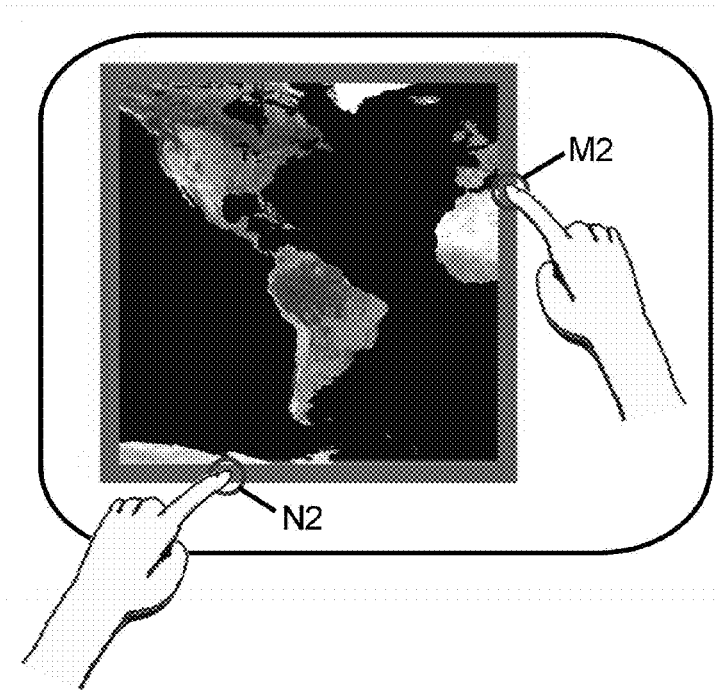

In accordance with the embodiment of window frame style 3, two points of contact disposed on adjacent edges of window 12 moves and uniformly scales window 12, as shown in FIGS. 6A and 6B. As shown in FIG. 6A, fingers f1 and f2, initially disposed on contact points M1 and N1, slide to contact points M2 and N2, thereby causing a uniform increase in the window size as shown in FIG. 6B.

Figure 7A:
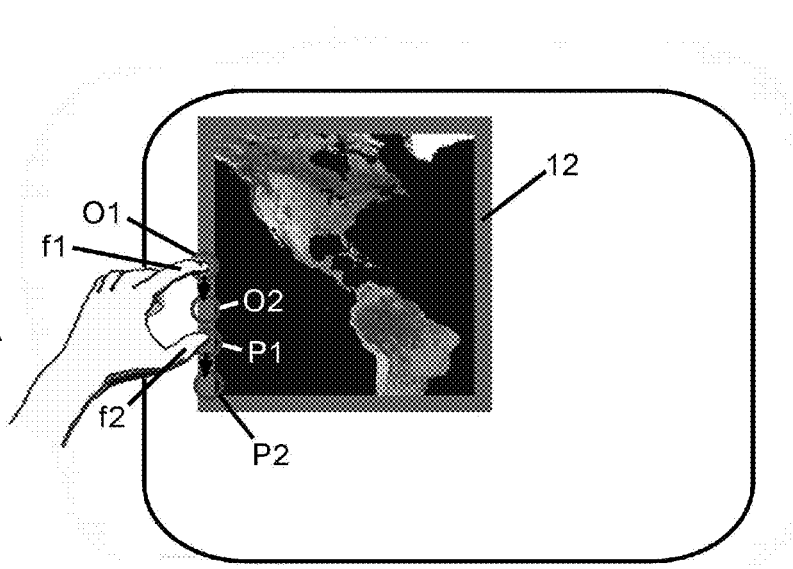
FIGS. 7A to 7C are schematic illustrations used to describe operations for controlling a window frame with fingers contacting the same edge of the window frame in accordance with the third embodiment of the present invention.
Figure 7B:
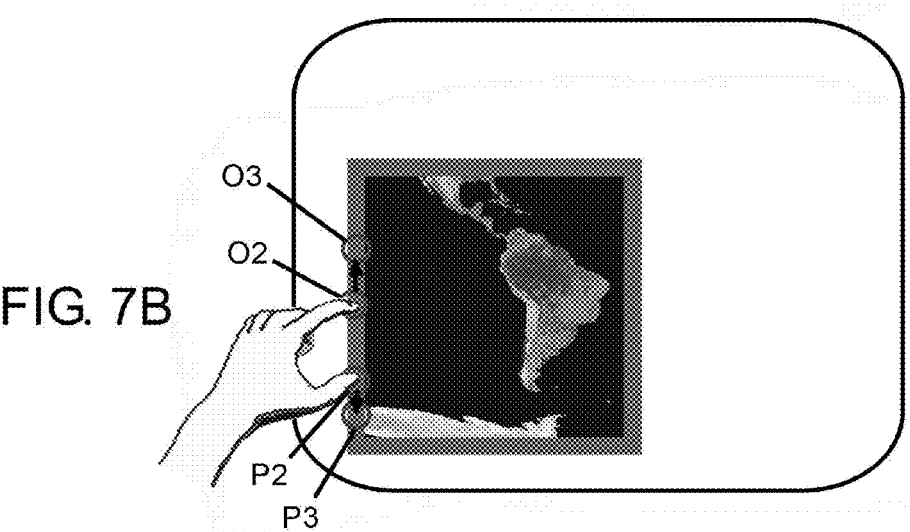
Figure 7C:
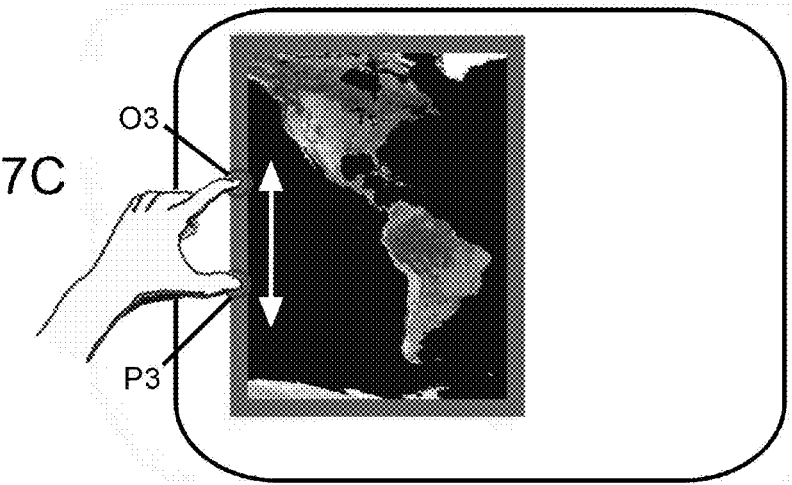

Two points of contact disposed on the same edge of window 12 controls the window in yet a different manner, namely the scale and position of that edge, as shown in FIGS. 7A, 7B and 7C. Fingers f1 and f2 initially are disposed on contact points O1 and P1, respectively, as shown in FIG. 7A. Uniform movement downward of the contact points to points O2 and P2 causes the relative position of the window to follow such movement, as shown in FIG. 7B. The two contact points positioned on the same edge further control the relative scale, that is, length of the edge. Specifically, increasing the distance between the two fingers, for example, sliding the fingers from respective contact points O2 and P2 to contact points O3 and P3, as shown in FIG. 7B, results in a proportional increase in the height of window 12, as shown in FIG. 7C.

Multi-Touch Enabled Rectilinear Window Frame Style 4

FIGS. 8A-8C and 9A-9C schematically show a fourth embodiment for controlling a window frame, referred to herein for convenience as window frame style 4. As shown in each of these figures, a window frame 20 is a sort-of double edge window and includes an inner frame 22 (or inner edge) and an outer frame 24 (or outer edge) in which a picture (or other image) 26 is disposed. Window frame style 4 operates in different manners depending on the number of contact points, the relative positions of those contacts including whether the contact points are disposed on the window's inner frame or its outer frame, and the movement of those contact points.

Figure 8A:
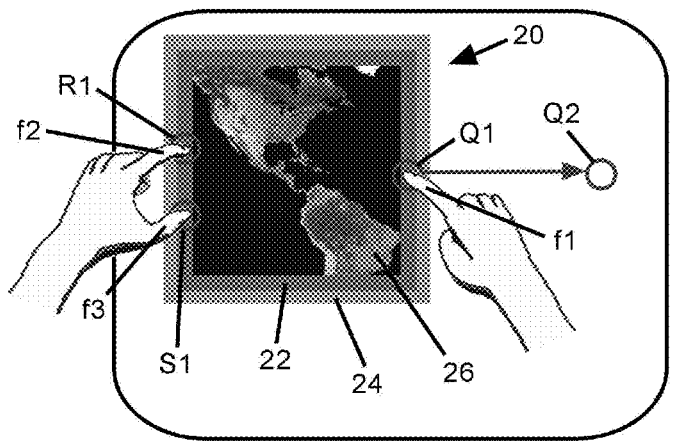
FIGS. 8A to 8C are schematic illustrations used to describe operations for controlling a window frame in accordance with a fourth embodiment of the present invention.
Figure 8B:
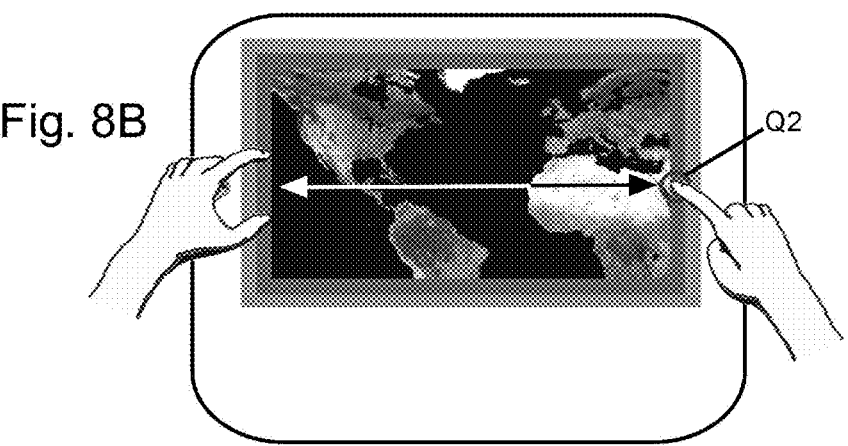
Figure 8C:
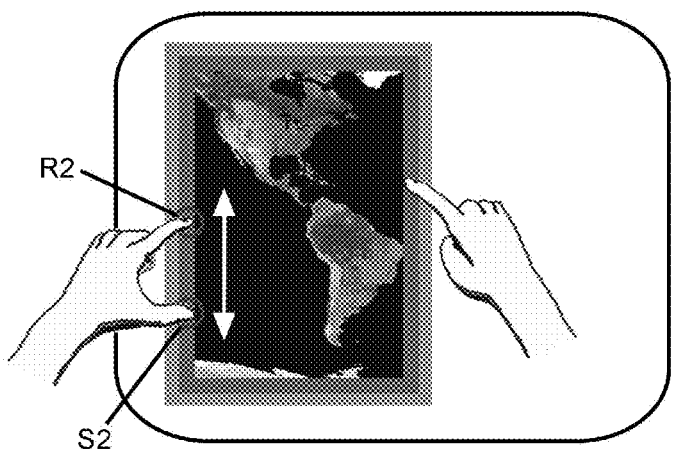

In accordance with the present invention, contacting the window's inner frame 22, such as shown in FIGS. 8A-8C, operates to control the window in any of the styles discussed above. For example, similar to the operation of window frame style 1 described above and described with reference to FIGS. 3A-3C, FIGS. 8A-8C illustrate how the width and/or the height of window 20 may be controlled utilizing three points of contact (e.g., fingers f1, f2 and f3). As shown in FIG. 8A, finger f1 initially is disposed on one edge of inner frame 22, and fingers f2 and f3 are then disposed on the opposite edge of inner frame 22 in order to trigger 3-point of contact control of the window. The width of window 20 increases (or decreases) with the horizontal movement of finger f1. As particularly shown in FIG. 8A, finger f1 moves from contact point Q1 to contact point Q2, thereby causing the right edge of window 20 to extend to contact point Q2, such as shown in FIG. 8B. Moving fingers f2 and f3 horizontally similarly controls the horizontal position of that edge. Like the embodiment of window style 1, a variation encompasses placing two fingers on the same edge to lock that edge in position, so that only the opposite edge moves horizontally when the finger contacting that edge of the inner frame 22 (e.g., finger f1) moves horizontally. In another variation, the edge on which a single finger is contacting is locked in position, with the horizontal position of the opposite edge being controlled by the other two fingers.

Height control of the window similarly is achieved, along with the variations mentioned above, by employing three contact points on the inner frame 22 of the upper and lower edges of the window 20.

In a further variation, spreading of fingers f2 and f3 apart (or moving together) from contact points R1 and S1, respectively, as shown in FIG. 8A, to contact points R2 and S2, as shown in FIG. 8C, controls the window's height to increase (or decrease) in proportion to the proportional increase (or decrease) in the distance between the fingers f2 and f3. Other variations mentioned above also may be employed.

In each of the embodiments and variations mentioned above, moving the window frame and/or increasing the size of the window frame (vertically and/or horizontally) and/or decreasing the size of the window frame (vertically and/or horizontally) is carried out by the use of one, two, three or four points of contact, where such window movement and/or window change does not cause any movement or change in size of the picture or image displayed within the frame relative to the display device.

Figure 9A:
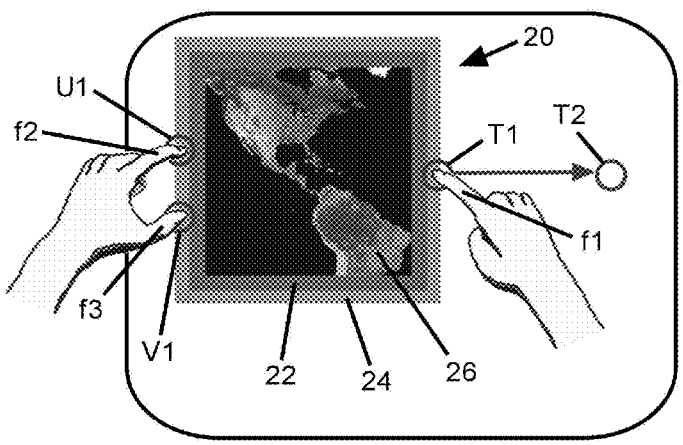
FIGS. 9A to 9C are schematic illustrations used to describe additional operations for controlling a window frame in accordance with the fourth embodiment of the present invention, in which the window frame and content therein are locked.
Figure 9B:
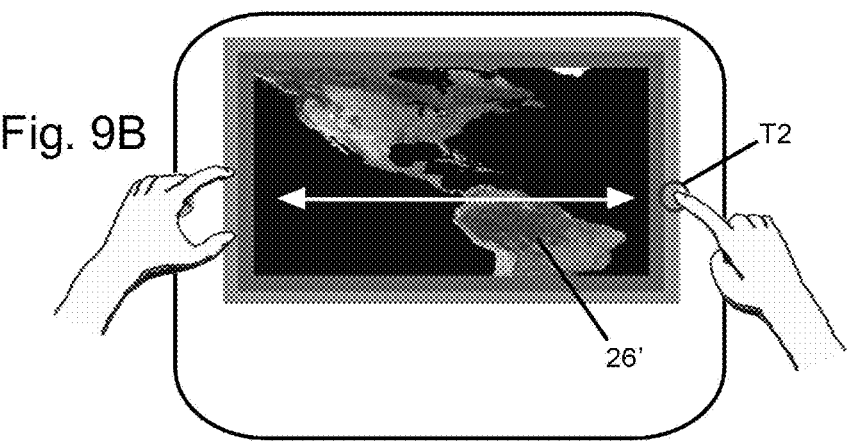
Figure 9C:
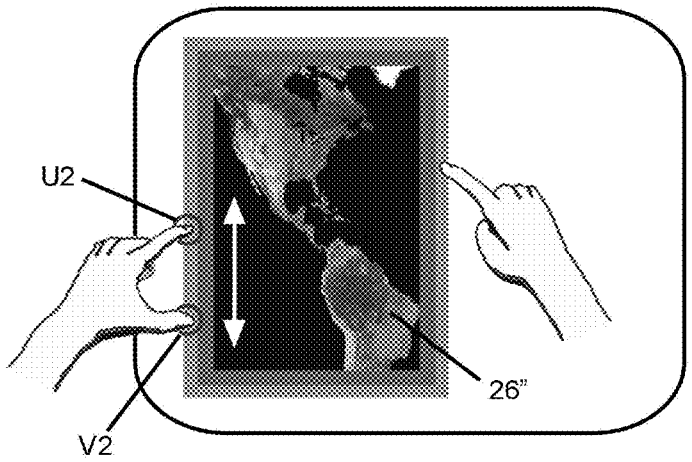

In accordance with the present invention, window frame style 4 further provides user movement and/or size (and rotation) control of the image displayed within the window by employing, that is, contacting, the window's outer frame 24. In particular, in each of the embodiments and variations described herein, initial placement of the contact point or contact points on the window's outer frame 24 locks the window frame and the content displayed therein together so that both window and content position and size are together controlled by the subsequent movement of one or more contact points. For example, FIGS. 9A-9C schematically illustrate controlling window 20 and content 26 therein by initially contacting (e.g., with fingers f1, f2 and f3) the outer frame 24 of window 20. As shown in FIG. 9A, finger f1 contacts one edge of outer frame 24, and fingers f2 and f3 contact the opposite edge of outer frame 24, thus locking the window frame and content therein together. Moving finger f1 from contact point T1 to contact point T2 controls both window 20 and image 26 displayed therein to stretch, thus producing image 26' displayed within the enlarged window, as schematically shown in FIG. 9B.

Furthermore, spreading of fingers f2 and f3 apart (or moving together) from contact points U1 and V1, respectively, as shown in FIG. 9A, to contact points U2 and V2, as shown in FIG. 9C, stretches (or shrinks) together both the window frame and content therein in proportion to the proportional increase (or decrease) in the distance between the fingers f2 and f3. As shown in FIG. 9C, image 26″ corresponds to image 26 but enlarged, or stretched, together with the enlarged window frame 20.

Each of the other forms of control, whether by one, two, three or four points of contact, as described herein, may be employed in manners consistent with the operation of window frame style 4, including rotational control of a window as previously discussed. Still yet, further variations may be employed. In one variation, the respective operations achieved when the inner and outer frames are contacted are reversed, whereby window control alone (i.e., the image displayed within the window is unaffected) is achieved by contacting the outer frame, and combined control of window and the image therein is achieved by contacting the inner frame.

Figure 10A:
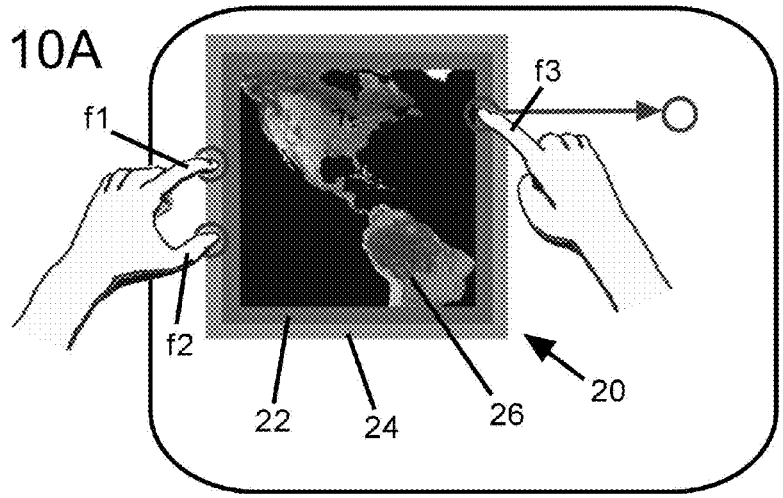
FIGS. 10A and 10B are schematic illustrations used to describe operations for controlling a window frame in accordance with a variation of the fourth embodiment of the present invention.
Figure 10B:
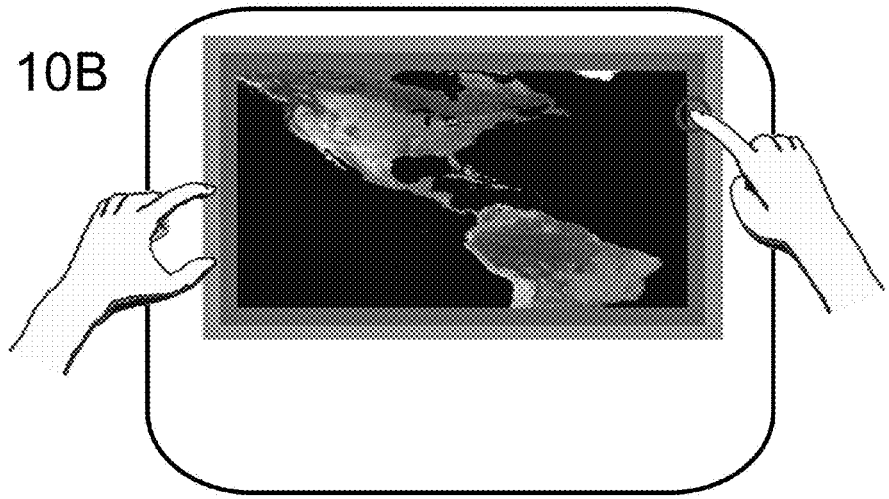

In yet another variation, the position of the first point of contact establishes the type of window/image control to be carried out. That is, if the first contact point is on the window's inner frame, only window control is carried out regardless of whether the outer or inner frame is subsequently contacted by additional contact elements. Or, if the first contact point is on the window's outer frame, then the window and content therein are locked together regardless of whether the outer or inner frame is subsequently contacted by additional contact elements. For example, if fingers f1 and f2 initially contact outer window frame 24, and finger f3 subsequently contacts inner window frame 22, as shown in FIG. 10A, then window and content control is actuated. Moving finger f3 thus causes both window 20 and image 26 displayed therein to stretch, as shown in FIG. 10B.

Figure 11A:
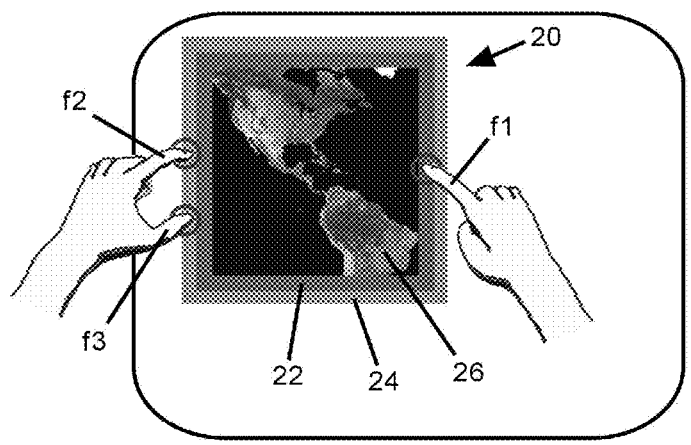
FIGS. 11A to 11C are schematic illustrations used to describe operations for controlling a window frame in accordance with another variation of the fourth embodiment of the present invention.
Figure 11B:
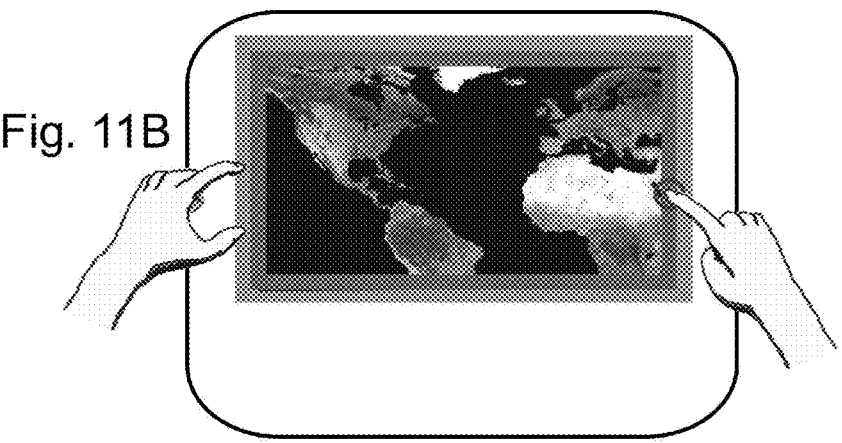
Figure 11C:
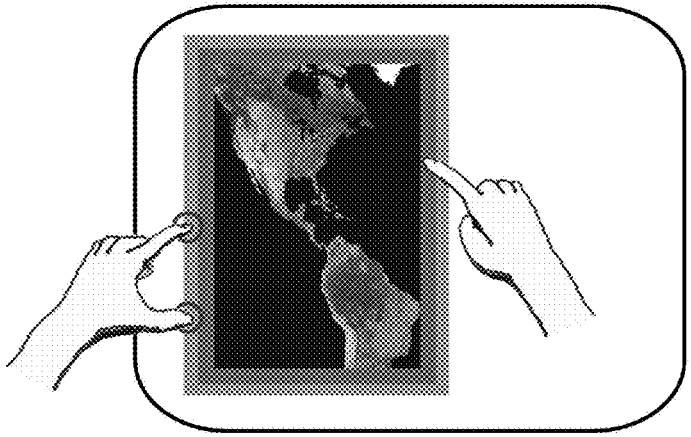

In yet a further variation, the moving element establishes the type of control to be carried out. For example, FIG. 11A shows finger f1 contacting inner window frame 22 and fingers f1 and f2 contacting outer window frame 24. The particular order in which the fingers contacted the window does not impact the type of window control to be carried out. Instead, moving finger f1 controls the size of window 20, without changing the size of image 26, as shown in FIG. 11B since finger f1 initially contacted inner frame 22. Conversely, moving finger f2 and/or finger f3 controls the size of both window 20 and image 26, as shown in FIG. 11C, since fingers f2 and f3 initially contacted outer frame 24.

In the embodiments and variations described herein in which content size is controllable, such as when the window frame and the content displayed therein are "locked" together, a preferable feature is to uniformly scale the content along both axes, which is also known as "fixed aspect ratio scaling." In the various embodiments/features described herein, uniform scaling may be implemented by uniformly enlarging/shrinking the content proportional to the increase/decrease in size of only either the width or height of the frame in which the content is displayed. Other known methods to carry out such uniform scaling also may be implemented within the various embodiments described herein.

Multiple Windows

In accordance with the present invention, each of the window frame styles and variations thereof as described above may be applied to the display and control thereof of multiple windows, referred to herein for convenience as Multi-Window. Different manners of such display and control may be applied as described below.

Multi-Window Style A—Independent Windows

Figure 12A:
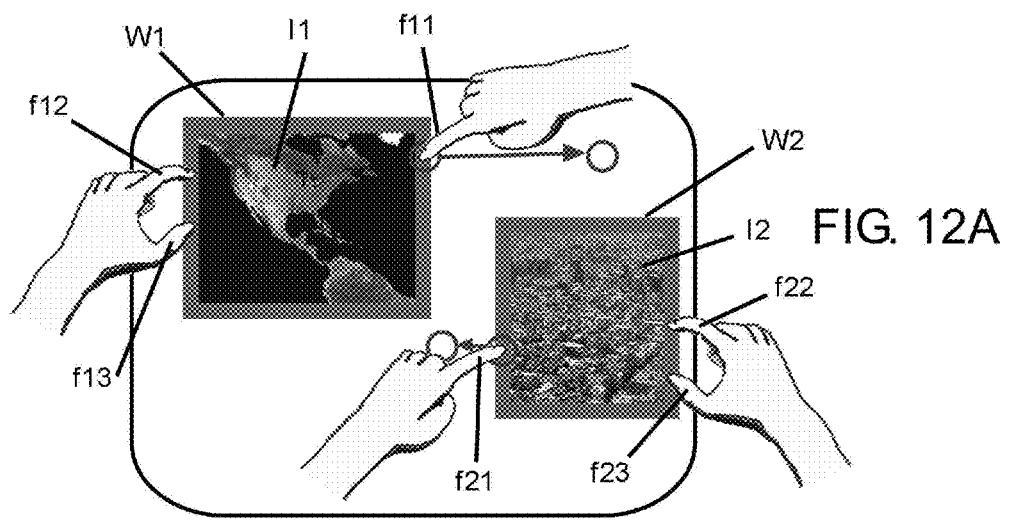
FIGS. 12A and 12B are schematic illustrations used to describe operations for controlling multiple, independent window frames in accordance with the present invention.
Figure 12B:
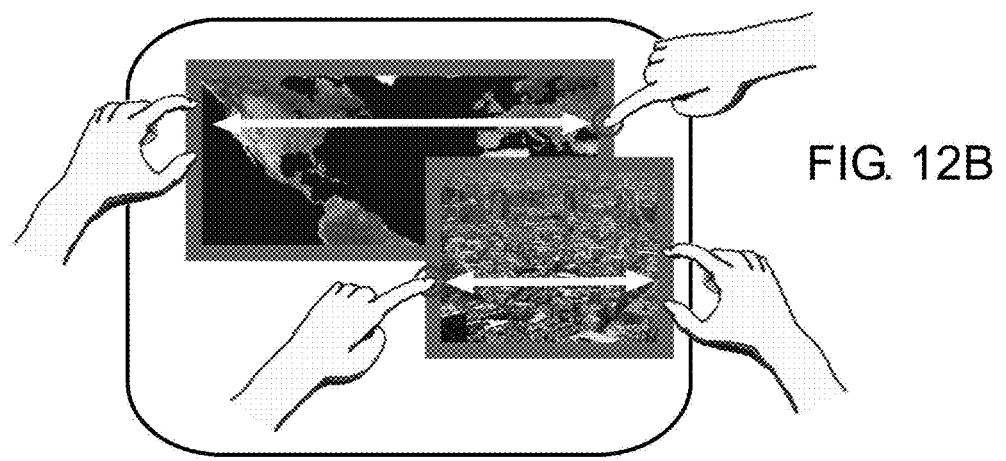

Multi-Window Style A, in accordance with the present invention, displays and controls each window in manners that are independent from the display and control of other windows and provides for assigning priority to any one of multiple overlapping windows. FIGS. 12A and 12B show windows W1 and W2 displayed simultaneously, each window providing separate and distinct images I1 and I2, and each window allowing for separate control by any of the window frame styles described herein. For example, FIGS. 12A and 12B illustrate how the width and/or height of windows W1 and W2 may each be independently controlled using three points of contact under window frame style 1. Specifically, FIG. 12A shows the horizontal width of window W1 being increased using three points of contact by moving finger f11 towards window W2. Similarly, FIG. 12A shows the horizontal width of window W2 also being increased, independent of window W1, by moving finger 21 towards window W1. While FIG. 12A specifically shows both windows being controlled using three points contact, any window frame method discussed herein may have be employed. FIG. 12B shows Windows W1 and W2 in their enlarged states. In this frame style, since each window may display a different image (including text), one window generally is given visual priority, with any overlapping portion of the other window being visually blocked. Changing window priority may be achieved in any known manner.

Multi-Window Style B—Common Display Windows

Figure 13A:
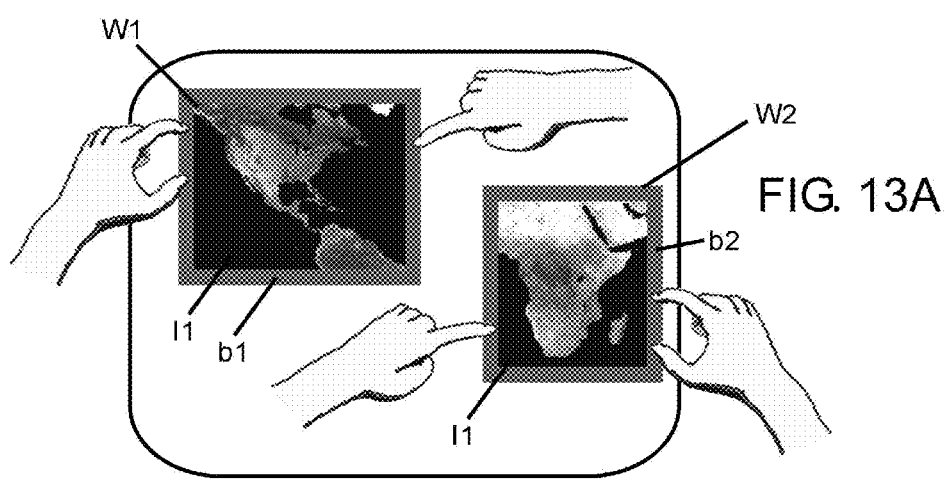
FIGS. 13A to 13C are schematic illustrations used to describe operations for controlling multiple, common display window frames in accordance with the present invention.
Figure 13B:
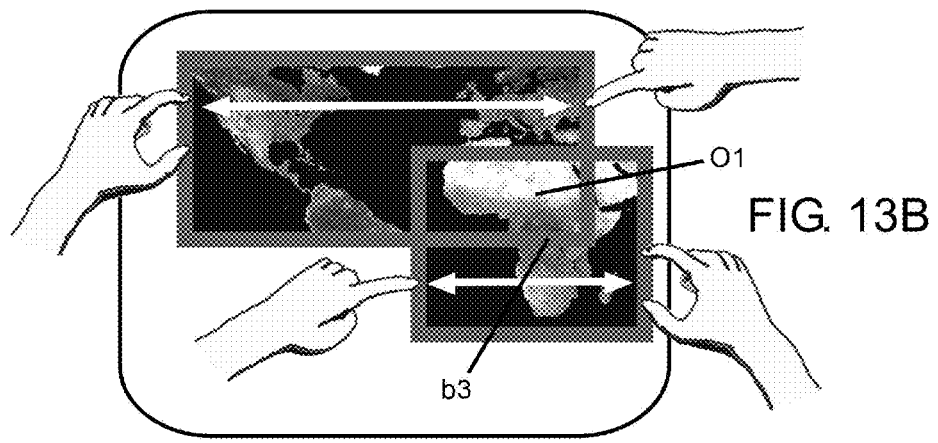
Figure 13C:
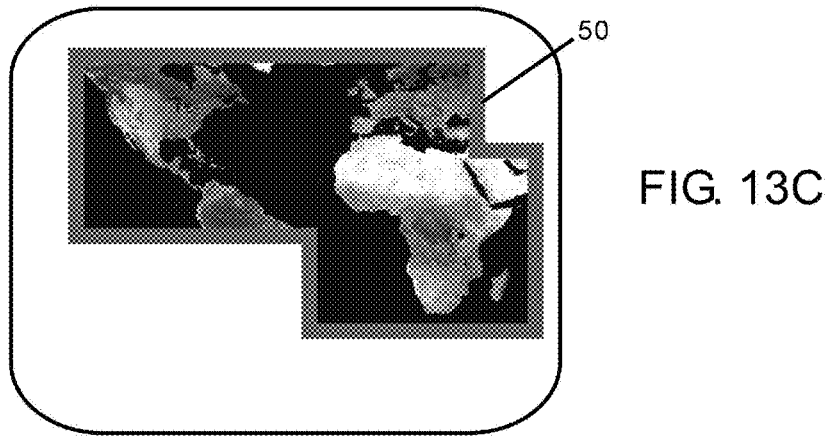

Multi-Window Style B, in accordance with the present invention, controls each window providing an image in manners that are independent from the control of other windows that provide that same image. FIGS. 13A-13C show windows W1 and W2 displayed simultaneously, with each window showing a separate view (or portion) of the same image I1. Frames b1 and b2 of Windows W1 and W2, respectively, may be controlled separately as previously discussed. For example, the width and/or height of a window may be controlled using window frame style 1 previously discussed. As shown in FIG. 13B, the windows are resized and/or moved so that they overlap with one another, with section O1 shown in FIG. 13B representing the overlapping portion of the two windows. Since the two windows display portions of the same image I1, window visibility priority need not be established.

Overlapping section O1 includes borders as shown in FIG. 13B. However, the borders of section O1 may be modified from that shown and, for example, may be made thinner, hashed, lighter in color, different in color, or different in another manner from the other border sections of Windows W1 and W2. In one variation, the borders of section O1 may be removed altogether, thereby providing an unobstructed view of the overlapping section as shown in FIG. 13C. Moreover, while the various views show rectangular shaped windows, with at least FIG. 13B showing a rectangular shaped overlapping section, the shape and size of each window, as well as overlapping sections thereof, may have different shapes, including round, oval, octagonal, heart-shaped, etc.

Multi-Window Style C—Lens Windows

Figure 14A:
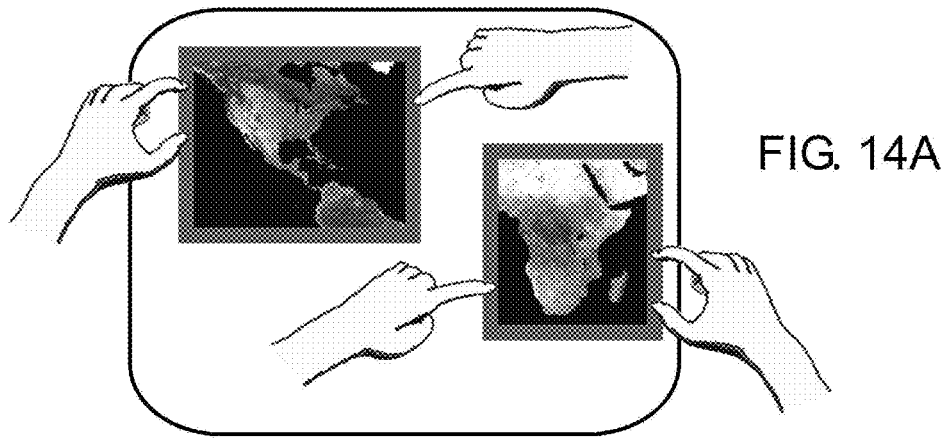
FIGS. 14A to 14C are schematic illustrations used to describe operations for controlling multiple, common display window frames in accordance with further embodiments of the present invention.
Figure 14B:
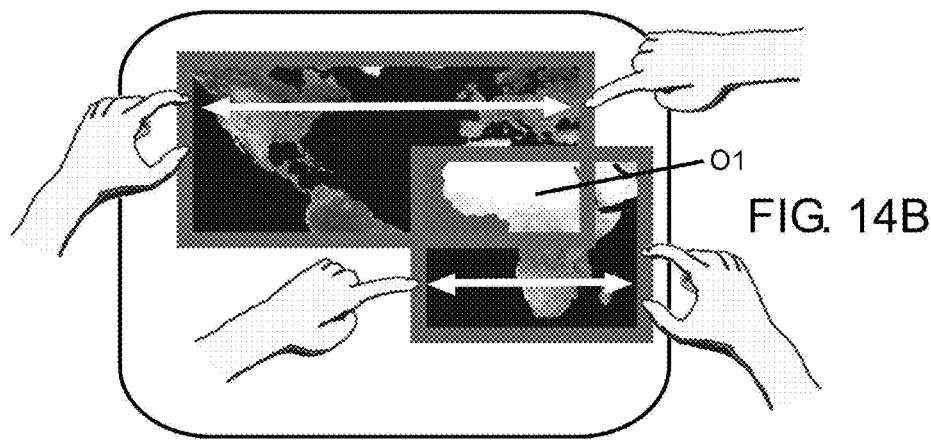

Multi-Window Style C, in accordance with the present invention, includes multiple windows that operate to display images in different manners. FIG. 14A shows two non-overlapping windows that may operate in manners previously described. When the windows overlap, such as shown in FIG. 14B, the image within the overlapping portion O1 is displayed in a manner that differs from the way the image is displayed in the non-overlapping window portions.

In the embodiment of Multi-Window Style C, the overlapping portion O1 operates as a sort of lens that displays a characteristic (or enhancement) of that portion of the image within overlapping portion O1 that is not visually provided elsewhere within the windows (i.e., within the non-overlapping portions). As one example, when the displayed image is a map such as shown in the figures, the image is displayed at a greater resolution within overlapping portion O1 than is displayed in non-overlapping portions of each window. In FIG. 14B, the image within portion O1 is shown lightened, as compared to other displayed portions of the map to illustrate such a different characteristic or enhancement. As a further example, the characteristic displayed within overlapping portion O1 is real time traffic data wherein the image that is displayed is a map that include street and other information useful to a traveler. As yet another example, the characteristic displayed may be a preview of the outcome of image processing, such as red eye reduction, monochrome conversion, or magnification. As yet a further example, in the case the information displayed within the windows is a computer-type file that includes embedded or hidden data (e.g., meta-data), such information may be made available for viewing and/or amending within the overlapping portion O1. Since the size and/or shape of the lens, that is, the overlapping portion O1 is user modifiable, the amount of additional or different information that is made available within the "lens" may be made as large or small as needed or desired.

Figure 14C:
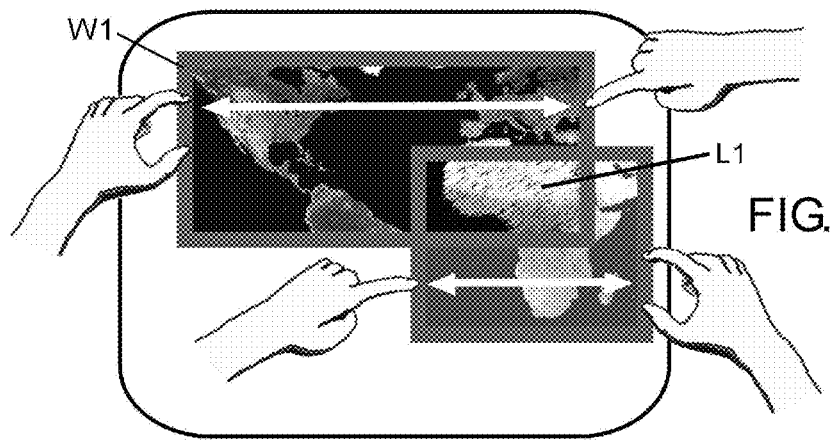

FIG. 14C shows yet a further variation of Multi-Window Style C, wherein section L1 is defined by the overlapping window portions. In this variation, each of at least two windows displays a respective portion of the same image in a different manner. In particular, window W1 in FIG. 14C displays a first characteristic of a portion of an image such as, for example, the temperature of the various regions displayed within window W1. Window W2, at the same time, displays a second characteristic of the image such as, for example, the relative altitude of the displayed image. In accordance with this variation, the overlapping portion L1 displays yet a third characteristic of that portion of the displayed image such as, for example, an amount of rain-fall via a color-coded key. In a variation, the overlapping portion L1 displays both the first and second characteristics of the image.

Multi-Window Style D—Lens Windows II

Figure 15A:
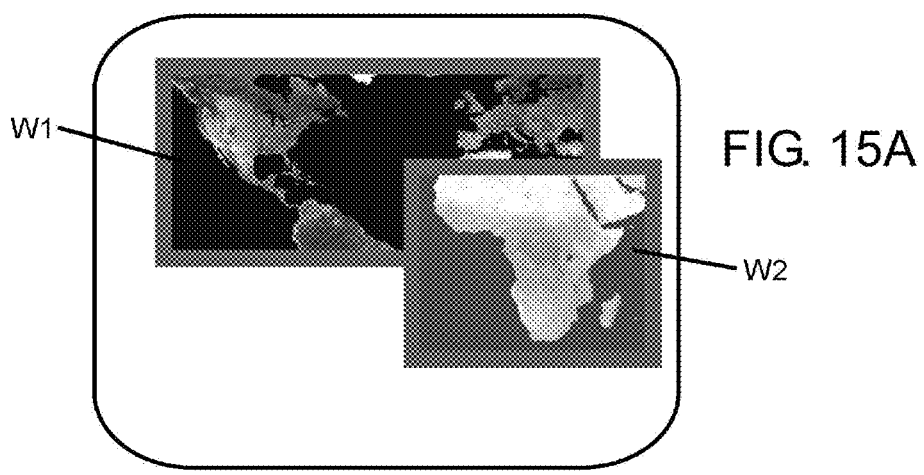
FIGS. 15A to 15E are schematic illustrations used to describe operations for controlling multiple, common display window frames in accordance with additional embodiments of the present invention.

Multi-Window Style D, in accordance with the present invention, includes multiple windows that display the same image, similar to styles B and C, but where the windows have layering, such as shown in style A. More specifically, and with reference to FIG. 15A, window W1 displays an image while window W2, which has visibility priority over window W1, operates as the lens that displays a characteristic or enhancement of the displayed image that is otherwise not provided within window W1. The characteristic or enhancement shown within window W2 may be an image processed version of the image that is displayed in window W1, or other characteristic/enhancement mentioned herein, or any characteristic or enhancement. Rotation, scale, and translation (RST) control of windows W1 and W2 may be carried out in any suitable manner, including those methods described herein.

Figure 15B:
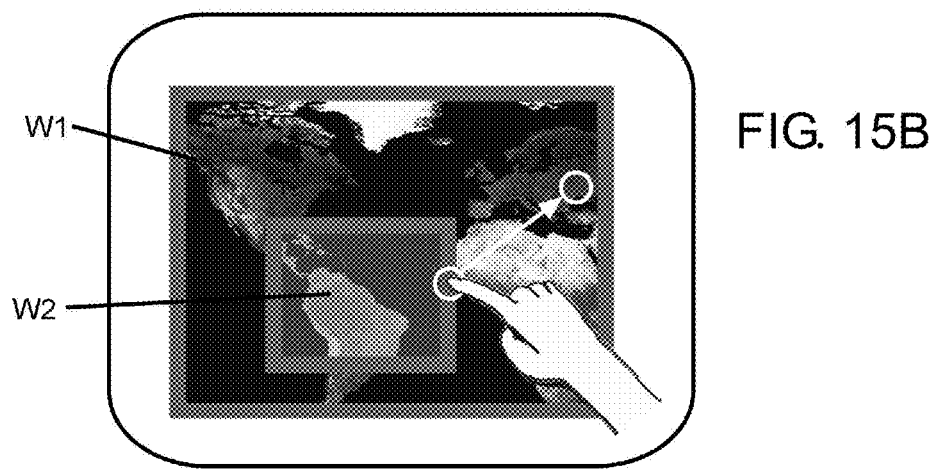
Figure 15C:
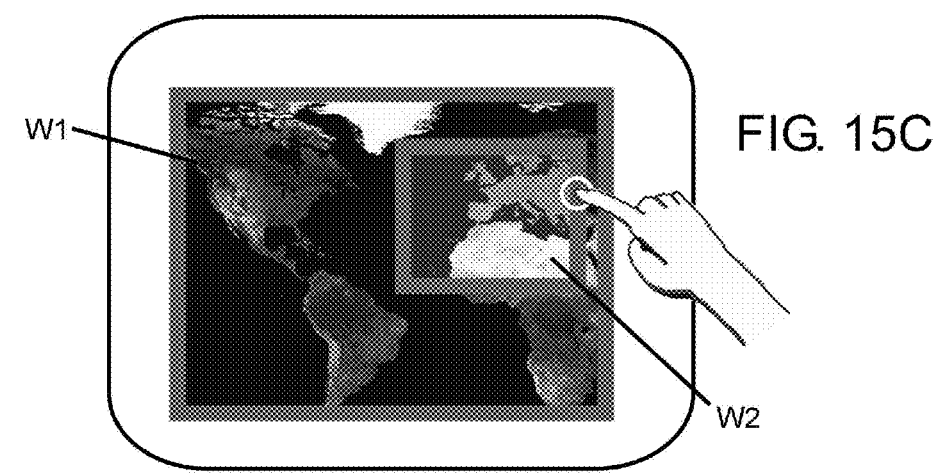

For illustrative purposes, FIG. 15B shows window W2 fully within window W1, which may be the case for any of the multi-window embodiments described herein. As mentioned above, windows W1 and W2 may be controlled in various manners. For example, FIG. 15C shows window W2 moved to a different position (still within window W1), such as, for example, by employing single finger control as described in connection with style 1 (see FIGS. 1A and 1B). As shown in FIGS. 15B and 15C, window W2 may be moved, and well as its size and orientation modified, without disturbing window W1.

Figure 15D:
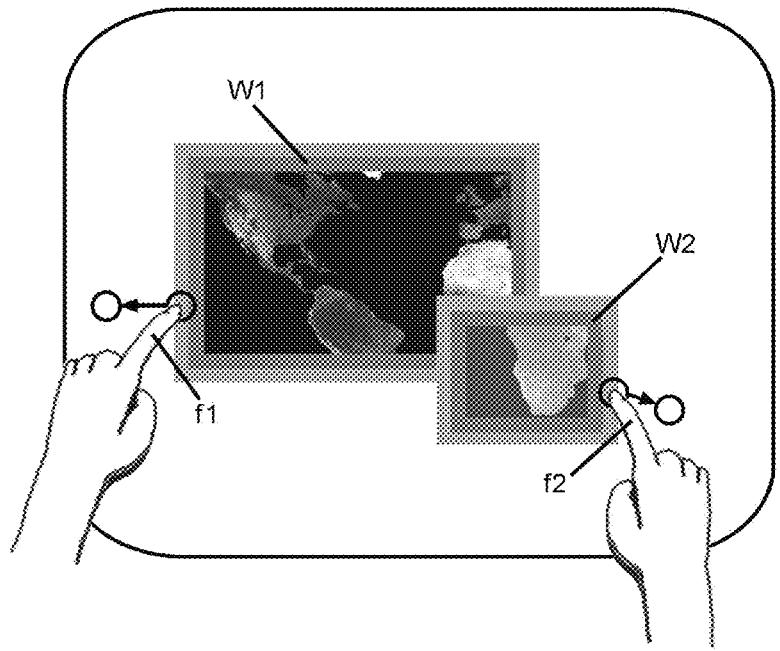
Figure 15E:
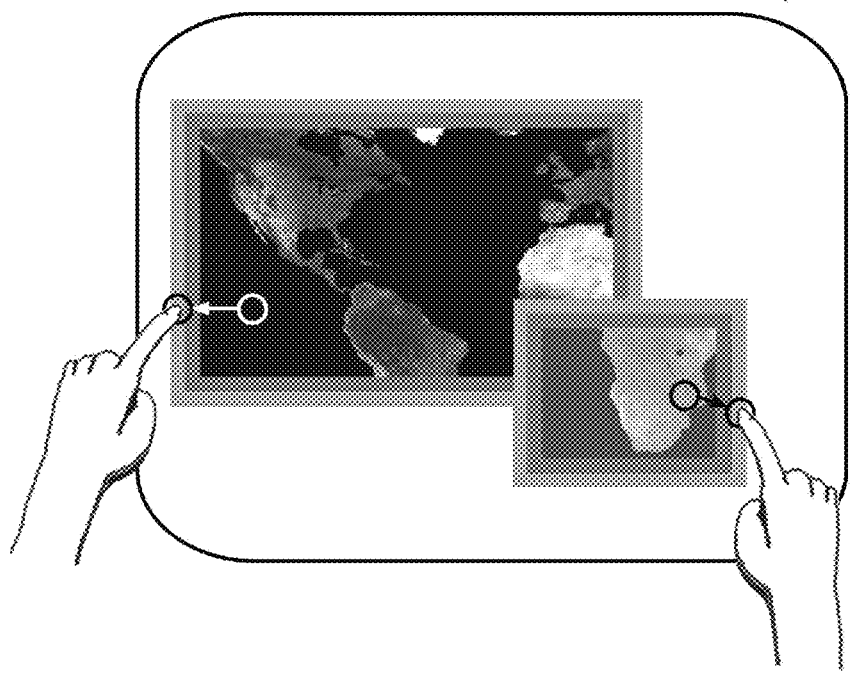

As mentioned above, each of the multiple windows displayed within the display device may be controlled in accordance with any of the embodiments and variations described herein. In certain embodiments, rotation/scale/translation (RST) control of the image/content displayed within the window may be employed, such as discussed in connection with, for example, Style 4 (e.g., see FIGS. 9A-9C). When the window frame and the content therein are "locked" together, both window and content position, size, and rotation are controlled together. In accordance with a particular feature of the present invention, a change of scale of one window frame when locked to the content therein (preferably, uniform scaling as mentioned above) causes a change of scale of all window frames displaying that content as a group. For example, FIGS. 15D and 15E illustrate a uniform scaling operation that is carried out when window W1 and the content therein are locked together. In the example shown in FIG. 15D, finger f1 contacting the outer edge of window W1 locks window W1 and the content therein together, and finger f2, by subsequently contacting an edge of window W2, is able to carry out RST control of the windows and content therein to produce the result shown in FIG. 15E. Hence, as the image/content increases (or decreases) in size, so do the multiple windows that display that content. Other manners of locking together the window and content, and controlling the scale thereof may also be employed. This feature of the present invention may be applied to any of the multi-window control styles described herein wherein multiple windows show different views of the same image/content, including multi-window styles B and C described above. Still further, the uniform scaling operation of the windows shown in FIGS. 15D and 15E may be employed, but without modifying the content within the windows, such as by contacting the inner edge of window W1 and subsequently contacting an edge of window W2. Then, subsequent movement of the fingers carries out RST control of the windows, but not of the content therein. Also, such as mentioned above, other manners of locking the windows together (but not content therein) may be employed.

As herein described, the multi-window styles enable for rotation, scale and translation (RST) control of multiple windows displayed simultaneously to a user, with each window showing either different images or different portions of the same image. In certain embodiments, different windows show the same characteristic or characteristics or features of the image while other characteristics or enhanced characteristics are provided within those portions of the windows that overlap with one another. In yet further embodiments and variations thereof, different windows each show different characteristics or features of the image, with their overlapping portions still yet showing additional and/or different information to the user. In the various figures presented, two rectangular-shaped windows are provided for ease of illustration, but more than two windows may be employed and/or displayed simultaneously, and the windows may have the same or different shapes as previously mentioned. In certain circumstances, multiple overlapping portions will be defined, generally depending on the size, shape and position of each window employed. The multiple overlapping windows may operate in the same manner, with each overlapping portion displaying the same characteristic of the image as the other overlapping portions. In a variation, the different overlapping portions show different characteristics or employ different functionality. In yet further variation, three or more windows may overlap at the same location thus forming an overlapping portion that may yet show a different characteristic or feature, and/or operate in a manner different from that of overlapping portions formed from only two windows.

As described herein, multiple embodiments of the present invention have been described in connection with the use of one, two, three, etc., fingers (contact points) contacting various parts of a window or windows described herein. In particular, various embodiments entail one or more fingers contacting one or more edges of a window that, in turn, enables particular control of the window depending on various factors, such as particular placement of the fingers (e.g., whether on the same edge, adjacent edges, etc.), subsequent movement of the fingers, and so on. The present invention, however, is not limited to placement of a particular finger solely on a single edge, but also encompasses manipulating a window by allowing a finger to be placed on a corner of a window, wherein such finger is deemed to be contacting two adjacent edges. Then, the window is manipulated in accordance with the manipulation rules that have been described. As one example, style 2 as herein described (with reference to FIGS. 4A and 4B) may be modified to allow a finger (e.g., finger f1) to contact a corner of the window (e.g., the lower, right hand corner) thus allowing the user to control two edges (e.g., the lower edge and the right-hand edge) via subsequent movement of that finger. In the exemplary diagram shown in FIG. 4A, all four edges are controlled with only 3 fingers (e.g., fingers f1, f2 and f3), without the need to employ a fourth finger (e.g., finger f4).

In addition to enabling a single finger to be a control for multiple, adjacent edges by contacting a corner of a window, in certain embodiments multiple fingers can be a control for a single edge. For example, FIGS. 4A and 4B show each edge being controlled by a single finger, but in a variation of style 2 described herein, there may be multiple fingers controlling a given edge (e.g., two fingers controlling the top edge).

Figure 16:
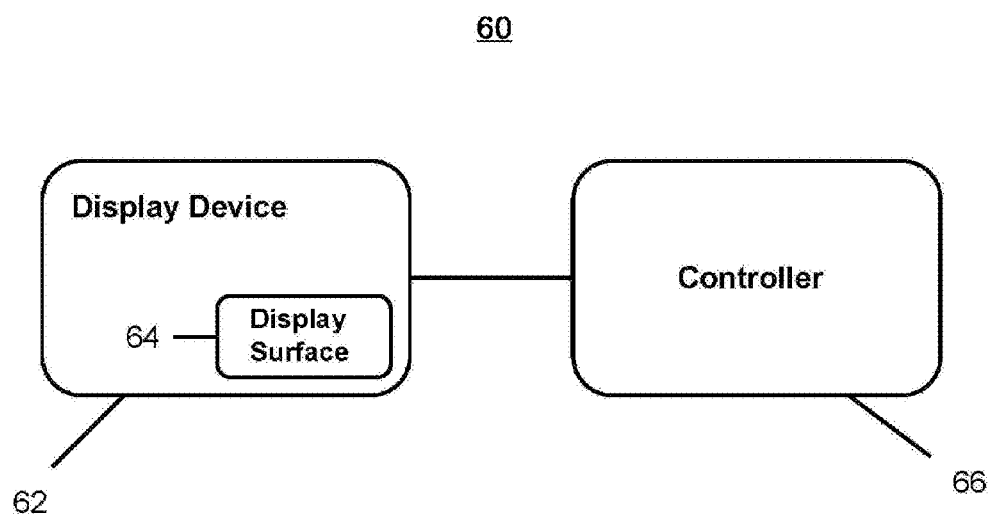
FIG. 16 is a block diagram of a system including a display device and a controller for carrying out the various operations and techniques of the present invention.

Various embodiments for interfacing with multi-input devices, and various features and variations thereof, have been described. The present invention also encompasses a system designed to carry out the various interfacing techniques and processes described herein. For example, FIG. 16 is a block diagram of a multi-input display system 60 that includes a display device 62 coupled (directly or indirectly) to a controller 66. Display device 62 includes a display surface 64 (also called contact surface) and may be any suitable type of multi-input display device capable of detecting multiple inputs simultaneously. Various suitable multi-input display devices that may be employed include those described in U.S. Patent Publication No. 2008/0029691A1, which is incorporated herein by reference. Controller 66 operates to carry out the various processing functions described herein, and may be a pre-programmed general purpose computer or other known system or device that carries out the novel functions/ steps as previously described. Controllers suitable for use within the present invention are well known, and it is within the abilities of one of ordinary skill in the art to design and/or program a controller to implement the processes, techniques and features of the present invention, given the description provided herein. By way of example only, the system of the present invention may be embodied within a programmed computer system that is coupled to or has an integrated multi-touch display device. By way of another example, the system of the present invention may be embodied within a portable multifunctional device (e.g., PDA) that contains an integrated multi-touch display. Various examples of portable multifunctional devices that may be modified or otherwise designed/ programmed to implement the processes/techniques of the present invention are disclosed in U.S. Pat. No. 7,479,949, which is incorporated herein by reference. Accordingly, the present invention encompasses a system that includes a display device and a controller capable of implementing the above-described techniques and processes. Consistent with other variations described herein, display device 62 may include a multi-input device and, as a separate element, a display device.

In describing the present invention as set forth herein, the terms "first", "second", and "third", etc., are used to distinguish one element, thing, contact, etc., from another, and are not used to designate relative position or arrangement in time, unless otherwise stated explicitly. For example, the phrases "first modification" and "second modification" as used herein does not mean that the second modification follows in time the first modification, but rather that the "first modification" and the "second modification" are distinct from one another.

The present invention has been described in the context of a number of embodiments, and for various ones of those embodiments, a number of variations and examples thereof. It is to be understood, however, that other expedients known to those skilled in the art or disclosed herein may be employed without departing from the spirit of the invention.

Therefore, it is intended that the appended claims be interpreted as including the embodiments described herein, the alternatives mentioned above, and all equivalents thereto.

What is claimed is:

1. A method performed by a multi-input display device, the method comprising:
    displaying on a multi-input display device a graphical window and at least a first portion of an image within the graphical window;
    identifying a number, position and movement of one or more elements contacting the display device, wherein identifying a number and position of one or more elements comprises identifying a first element and a second element as contacting the display device initially at positions on a first edge of a frame of the displayed graphical window and identifying a third element as contacting the display device initially at a position on a second edge opposite the first edge of the frame of the displayed graphical window;
    changing a characteristic of the displayed graphical window in accordance with the identified number, position and movement of the one or more elements contacting the display device, the characteristic corresponding to a first characteristic when only one element is identified as contacting the display device, the first characteristic being a position of the displayed graphical window; and the characteristic corresponding to a second characteristic when a plurality of elements are identified as contacting the display device, the second characteristic being at least one of a shape and size of the displayed graphical window, the first and second characteristics being different, wherein changing a characteristic comprises, when the first and the second elements are identified as contacting the display device initially at the positions on the first edge and the third element is identified as contacting the display device initially at the position on the second edge:
        in response to identifying that the first and the second elements are contacting the display device initially at the positions on the first edge, locking the first edge in position;
        moving the second edge of the frame of the displayed graphical window in alignment with the identified movement of the third element; and maintaining the first edge of the frame at a fixed position; and displaying on the display device at least a second portion of the image within the graphical window having the changed characteristic such that positions on the display device of common portions of the first and the second portions of the image remain stationary relative to the multi-input display device.

2. The method of claim 1,
wherein identifying a number and position of one or more elements comprises identifying two elements as contacting the display device initially at positions on the displayed graphical window, and
wherein changing a characteristic comprises, when the two elements are identified as contacting the display device initially at the positions on the displayed graphical window, uniformly scaling the size of the displayed graphical window in accordance with the identified movement of the two elements.

3. The method of claim 1,
wherein identifying a number and position of one or more elements comprises identifying two elements as contacting the display device initially at positions on the displayed graphical window, and
wherein changing a characteristic comprises, when the two elements are identified as contacting the display device initially at the positions on the displayed graphical window, moving and scaling the size of the displayed graphical window in accordance with the identified movement of the two elements.

4. The method of claim 3, wherein moving and scaling includes rotating the displayed graphical window in accordance with changes in orientation of the identified positions of the two elements relative to one another.

5. The method of claim 1,
wherein identifying a number and position of one or more elements comprises identifying three elements as contacting the display device initially at positions on the frame of the displayed graphical window, and
wherein changing a characteristic comprises, when the three elements are identified as contacting the display device initially at the positions on the frame, manipulating a shape of the displayed graphical window based on changes in the identified positions of the three elements in accordance with a best fit methodology.

6. The method of claim 5, wherein manipulating the shape of the displayed graphical window based on changes in the identified positions of the three elements is a 5 degree of freedom operation.

7. The method of claim 1, wherein changing a characteristic comprises modifying the shape of the displayed graphical window by moving the first edge of the frame of the displayed graphical window in alignment with identified joint movement of the first and the second elements and maintaining the second edge of the frame in alignment with the identified position of the third element.

8. The method of claim 1, wherein changing a characteristic comprises changing a length of the first and the second edges of the frame of the displayed graphical window in accordance with a change in distance between the identified positions of the first and the second elements.

9. The method of claim 1, wherein changing a characteristic comprises rotating the displayed graphical window in accordance with changes in orientation of the identified positions of the first and the second elements relative to one another so that the first edge of the frame of the displayed graphical window is aligned with an axis extending through the first and the second elements as the first and the second elements move.

10. The method of claim 1, wherein the displayed graphical window is rectangular in shape, and changing a characteristic comprises: aligning the first edge of the frame of the displayed graphical window with an axis extending through the identified positions of the first and the second elements, wherein aligning the first edge includes at least one of keeping the first edge stationary, moving the first edge vertically, moving the first edge horizontally, and rotating the first edge; changing a length of the first and the second edges of the frame in accordance with a change in distance between the identified positions of the first and the second elements; and aligning the second edge of the flame with the identified position of the third element.

11. A method performed by a multi-input display device, the method comprising:
displaying on a multi-input display device a graphical window and at least a first portion of an image within the graphical window;
identifying a number, position and movement of a plurality of elements that are simultaneously in contact with the display device, wherein identifying a number and position of the plurality of elements comprises identifying a first element and a second element as being in simultaneous contact with the display device initially at positions on a first edge of a frame of the displayed graphical window and identifying a third element as being in simultaneous contact with the display device initially at a position on a second edge opposite the first edge of the frame of the displayed graphical window;
manipulating the displayed graphical window in accordance with one or more of a plurality of modifications, the plurality of modifications comprising:
a first modification implemented when only two elements are identified as being simultaneously in contact with the display device at positions on the frame of the displayed graphical window, the first modification changing at least one of a shape and a size of the displayed graphical window in accordance with the identified positions and movement of the two elements, and
a second modification implemented when three elements are identified as being simultaneously in contact with the display device at positions on the frame of the displayed graphical window, the second modification changing at least one of a position, a shape and a size of the displayed graphical window in accordance with the identified positions and movement of the three elements, the first and the second modifications being different, wherein the second modification is implemented when the first and the second elements are identified as being in simultaneous contact with the display device initially at the positions on the first edge and the third element is identified as being in simultaneous contact with the display device initially at the position on the second edge, and wherein the second modification comprises:
in response to identifying the first and the second elements as being in simultaneous contact with the display device initially at the positions on the first edge, locking the first edge in position;
moving the second edge of the frame of the displayed graphical window in alignment with the identified movement of the third element; and maintaining the first edge of the frame at a fixed position; and displaying on the display device at least a second portion of the image within the manipulated graphical window such that positions on the display device of common portions of the first and the second portions of the image remain stationary relative to the multi-input display device.

12. The method of claim 11, wherein the first modification comprises uniformly scaling the size of the displayed graphical window in accordance with the identified movement of the two elements.

13. The method of claim 11, wherein the first modification comprises moving and scaling the size of the displayed graphical window in accordance with the identified movement of the two elements.

14. The method of claim 13, wherein the first modification includes rotating the displayed graphical window in accordance with changes in orientation of the identified positions of the two elements relative to one another.

15. The method of claim 11, wherein the second modification comprises changing a shape of the displayed graphical window based on changes in the identified positions of the three elements in accordance with a best fit methodology.

16. The method of claim 15, wherein changing the shape of the displayed graphical window based on changes in the identified positions of the three elements is a 5 degree of freedom operation.

17. The method of claim 11, wherein the second modification comprises modifying the shape of the displayed graphical window by moving the first edge of the frame of the displayed graphical window in alignment with identified joint movement of the first and the second elements and maintaining the second edge of the frame in alignment with the identified position of the third element.

18. The method of claim 11, wherein the second modification comprises changing a length of the first and the second edges of the frame of the displayed graphical window in accordance with a change in distance between the identified positions of the first and the second elements.

19. The method of claim 11, wherein the second modification comprises rotating the displayed graphical window in accordance with changes in orientation of the identified positions of the first and the second elements relative to one another so that the first edge of the frame of the displayed graphical window is aligned with an axis extending through the first and the second elements as the first and the second elements move.

20. The method of claim 11, wherein the displayed graphical window is rectangular in shape, and the second modification comprises:
aligning the first edge of the frame of the displayed graphical window with an axis extending through the identified positions of the first and the second elements, wherein aligning the first edge includes at least one of keeping the first edge stationary, moving the first edge vertically, moving the first edge horizontally, and rotating the first edge;
changing a length of the first and the second edges of the frame in accordance with a change in distance between the identified positions of the first and the second elements; and
aligning the second edge of the frame with the identified position of the third element.

21. A multi-input display system, comprising:
a display device configured to display on a display surface a graphical window and at least a first portion of an image within the graphical window and detect one or more elements contacting the display surface; and
a controller configured to:
identify a number, position and movement of the one or more elements contacting the display surface, wherein the controller being configured to identify a number and position of the one or more elements comprises the controller being configured to identify a first element and a second element as contacting the display device initially at positions on a first edge of a frame of the displayed graphical window, and to identify a third element as contacting the display device initially at a position on a second edge opposite the first edge of the frame of the displayed graphical window; and
change a characteristic of the displayed graphical window in accordance with the identified number, position and movement of the one or more elements contacting the display surface, the characteristic corresponding to a first characteristic when only one element is identified as contacting the display surface, the first characteristic being a position of the displayed graphical window; and the characteristic corresponding to a second characteristic when a plurality of elements are identified as contacting the display surface, the second characteristic being at least one of a shape and size of the displayed graphical window, the first and the second characteristics being different, wherein the controller being configured to change a characteristic comprises, when the first and the second elements are identified as contacting the display device initially at the positions on the first edge and the third element is identified as contacting the display device initially at the position on the second edge:
in response to identifying that the first and the second elements are contacting the display device initially at the positions on the first edge, the controller being configured to lock the first edge in position;
the controller being configured to move the second edge of the frame of the displayed graphical window in alignment with the identified movement of the third element; and
the controller being configured to maintain the first edge of the frame at a fixed position;
wherein the controller is configured to control the display device to display on the display surface at least a second portion of the image within the graphical window having the changed characteristic such that positions on the display surface of common portions of the first and the second portions of the image remain stationary relative to the display surface.

22. The system of claim 21,
wherein the controller being configured to identify a number and position of one or more elements comprises the controller being configured to identify two elements as contacting the display surface initially at positions on the displayed graphical window, and
wherein the controller being configured to change a characteristic comprises the controller being configured to, when the two elements are identified as contacting the display surface initially at the positions on the graphical window, uniformly scale the size of the displayed graphical window in accordance with the identified movement of the two elements.

23. The system of claim 21,
wherein the controller being configured to identify a number and position of one or more elements comprises the controller being configured to identify two elements as contacting the display surface initially at positions on the displayed graphical window, and wherein the controller being configured to change a characteristic comprises the controller being configured to, when the two elements are identified as contacting the display surface initially at the positions on the graphical window, move and scale the size of the displayed graphical window in accordance with the identified movement of the two elements.

24. The system of claim 23, wherein the controller is configured to rotate the displayed graphical window in accordance with changes in orientation of the identified positions of the two elements relative to one another.

25. The system of claim 21, wherein the controller being configured to identify a number and position of one or more elements comprises the controller being configured to identify three elements as contacting the display surface initially at positions on the frame of the displayed graphical window, and wherein the controller being configured to change a characteristic comprises the controller being configured to, when the three elements are identified as contacting the display surface initially at positions on the frame of the graphical window, manipulate a shape of the displayed graphical window based on changes in the identified positions of the three elements in accordance with a best fit methodology.

26. The system of claim 25, wherein the controller is configured to manipulate the shape of the graphical window in accordance with a 5 degree of freedom operation.

27. The system of claim 21, wherein the controller is configured to modify the shape of the displayed graphical window by moving the first edge of the frame of the displayed graphical window in alignment with identified joint movement of the first and the second elements and maintaining the second edge of the frame in alignment with the identified position of the third element.

28. The system of claim 21, wherein the controller is configured to change a length of the first and second edges of the frame of the displayed graphical window in accordance with a change in distance between the identified positions of the first and the second elements.

29. The system of claim 21, wherein the controller is configured to rotate the displayed graphical window in accordance with changes in orientation of the identified positions of the first and the second elements relative to one another so that the first edge of the frame of the displayed graphical window is aligned with an axis extending through the first and the second elements as the first and the second elements move.

30. The system of claim 21, wherein the displayed graphical window is rectangular in shape, and the controller is adapted to:

align the first edge of the frame of the displayed graphical window with an axis extending through the identified positions of the first and the second elements, wherein aligning the first edge includes at least one of keeping the first edge stationary, moving the first edge vertically, moving the first edge horizontally, and rotating the first edge;

change a length of the first and the second edges of the frame in accordance with a change in distance between the identified positions of the first and the second elements; and align the second edge of the frame with the identified position of the third element.

31. A multi-input display system, comprising:

a display device configured to display on a display surface a graphical window and at least a first portion of an image within the graphical window, and detect a plurality of elements that are simultaneously in contact with the display surface;

a controller configured to identify a number, position and movement of the plurality of elements that are simultaneously in contact with the display surface, wherein the controller being configured to identify a number and position of the plurality of elements comprises the controller being configured to identify a first element and a second element as being in simultaneous contact with the display surface initially at positions on a first edge of a frame of the displayed graphical window, and the controller being configured to identify a third element as being in simultaneous contact with the display surface initially at a position on a second edge opposite the first edge of the frame of the displayed graphical window, and the controller is configured to manipulate the displayed graphical window in accordance with one or more of a plurality of modifications, the plurality of modifications comprising:

a first modification implemented when only two elements are identified as being simultaneously in contact with the display surface at positions on the frame of the displayed graphical window, the first modification changing at least one of a shape and a size of the displayed graphical window in accordance with the identified positions and movement of the two elements and a second modification implemented when three elements are identified as being simultaneously in contact with the display surface at positions on the frame of the displayed graphical window, the second modification changing at least one of a position, a shape and a size of the displayed graphical window in accordance with the identified positions and movement of the three elements, the first and the second modifications being different, wherein the controller is configured to implement the second modification when the first and the second elements are identified as being in simultaneous contact with the display surface initially at the positions on the first edge and the third element is identified as being in simultaneous contact with the display surface initially at the position on the second edge, and wherein the second modification comprises:

in response to identifying the first and the second elements as being in simultaneous contact with the display device initially at the positions on the first edge, locking the first edge in position;

moving the second edge of the frame of the displayed graphical window in alignment with the identified movement of the third element, and maintaining the first edge of the frame at a fixed position, wherein the controller is configured to control the display device to display on the display surface at least a second portion of the image within the manipulated graphical window such that positions on the display surface of common portions of the first and second portions of the image remain stationary relative to the display surface.

32. The system of claim 31, wherein the first modification comprises uniformly scaling the size of the displayed graphical window in accordance with the identified movement of the two elements.

33. The system of claim 31, wherein the first modification comprises moving and scaling the size of the displayed graphical window in accordance with the identified movement of the two elements.

34. The system of claim 33, wherein the first modification includes rotating the displayed graphical window in accordance with changes in orientation of the identified positions of the two elements relative to one another.

35. The system of claim 31, wherein the second modification comprises changing a shape of the displayed graphical window based on changes in the identified positions of the three elements in accordance with a best fit methodology.

36. The system of claim 35, wherein changing the shape of the displayed graphical window based on changes in the identified positions of the three elements is a 5 degree of freedom operation.

37. The system of claim 31, wherein the second modification comprises modifying the shape of the displayed graphical window by moving the first edge of the frame of the displayed graphical window in alignment with identified joint movement of the first and the second elements and maintaining the second edge of the frame in alignment with the identified position of the third element.

38. The system of claim 37, wherein the second modification comprises changing a length of the first and the second edges of the frame of the displayed graphical window in accordance with a change in distance between the identified positions of the first and the second elements.

39. The system of claim 31, wherein the second modification comprises rotating the displayed graphical window in accordance with changes in orientation of the identified positions of the first and the second elements relative to one another so that the first edge of the frame of the displayed graphical window is aligned with an axis extending through the first and the second elements as the first and the second elements move.

40. The system of claim 31, wherein the displayed graphical window is rectangular in shape, and the second modification comprises:
   aligning the first edge of the frame of the displayed graphical window with an axis extending through the identified positions of the first and second elements, wherein aligning the first edge includes at least one of keeping the first edge stationary, moving the first edge vertically, moving the first edge horizontally, and rotating the first edge;
   changing a length of the first and the second edges of the frame in accordance with a change in distance between the identified positions of the first and the second elements; and
   aligning the second edge of the frame with the identified position of the third element.

41. A method performed by a multi-input display device, the method comprising:
   displaying a window on a display surface of the multi-input display device, the window being re-sizeable, re-shapeable, and movable relative to the display surface;
   displaying a visible portion of an image within the window, the image having a stationary position relative to the display surface, wherein the visible portion of the image depends on a size, shape and position of the window relative to the display surface;
   identifying a quantity, position, and movement of one or more elements contacting the display surface, wherein identifying a quantity and position of one or more elements comprises identifying a first element and a second element as contacting the display device initially at positions on a first edge of a frame of the displayed graphical window and identifying a third element as contacting the display device initially at a position on a second edge opposite the first edge of the frame of the displayed graphical window; and
   changing a characteristic of the displayed window in accordance with the identified quantity, position, and movement of the one or more elements contacting the display surface, wherein the changed characteristic corresponds to the position of the window relative to the display surface provided that only one element is identified as contacting the display surface, and the changed characteristic corresponds to at least one of the size and the shape of the window provided that a plurality of elements is identified as contacting the display surface, wherein changing a characteristic comprises, when the first and the second elements are identified as contacting the display device initially at the positions on the first edge and the third element is identified as contacting the display device initially at the position on the second edge:
      in response to identifying that the first and the second elements are contacting the display device initially at the positions on the first edge, locking the first edge in position;
      moving the second edge of the frame of the displayed graphical window in alignment with the identified movement of the third element; and
      maintaining the first edge of the frame at a fixed position,
   wherein changing the characteristic of the displayed window concurrently changes the visible portion of the image without changing the stationary position of the image relative to the display surface.

42. A method performed by a multi-input display device, the method comprising:
   displaying a window on a display surface of the multi-input display device, the window being re-sizeable, re-shapeable, and movable relative to the display surface;
   displaying a visible portion of an image within the window, the image having a stationary position relative to the display surface, wherein the visible portion of the image depends on a size, shape and position of the window relative to the display surface;
   identifying a quantity, position, and movement of two or more elements contacting the display surface, wherein identifying a quantity and position of two or more elements comprises identifying a first element and a second element as contacting the display device initially at positions on a first edge of a frame of the displayed graphical window and identifying a third element as contacting the display device initially at a position on a second edge opposite the first edge of the frame of the displayed graphical window; and
   changing a characteristic of the displayed window in accordance with the identified quantity, position, and movement of the two or more elements contacting the display surface, wherein the changed characteristic corresponds (i) to at least one of the size and the shape of the window relative to the display surface provided that two elements are identified as simultaneously contacting the display surface, and (ii) to at least one of the position, the size, and the shape of the window provided that three elements are identified as contacting the display surface, wherein changing a characteristic comprises, when the first and the second elements are identified as contacting the display device initially at the positions on the first edge and the third element is identified as contacting the display device initially at the position on the second edge:
in response to identifying that the first and the second elements are contacting the display device initially at the positions on the first edge, locking the first edge in position;
moving the second edge of the frame of the displayed graphical window in alignment with the identified movement of the third element; and
maintaining the first edge of the frame at a fixed position, and
wherein changing the characteristic of the displayed window concurrently changes the visible portion of the image without changing the stationary position of the image relative to the display surface.

* * * * *